US010730246B2

(12) United States Patent
Iwata et al.

(10) Patent No.: US 10,730,246 B2
(45) Date of Patent: Aug. 4, 2020

(54) FIBER-REINFORCED MEMBER AND METHOD FOR MANUFACTURING SAME

(71) Applicants: MIZUNO CORPORATION, Osaka-shi, Osaka (JP); MIZUNO TECHNICS CORPORATION, Yoro-gun, Gifu (JP)

(72) Inventors: Mototaka Iwata, Osaka (JP); Katsuyuki Aizawa, Gifu (JP)

(73) Assignees: Mizuno Corporatioon, Osaka (JP); Mizuno Technics Corporation, Yoro-gun (JP)

( * ) Notice: Subject to any disclaimer, the term of this patent is extended or adjusted under 35 U.S.C. 154(b) by 376 days.

(21) Appl. No.: 15/469,263

(22) Filed: Mar. 24, 2017

(65) Prior Publication Data
US 2017/0274603 A1   Sep. 28, 2017

(30) Foreign Application Priority Data
Mar. 24, 2016 (JP) .................. 2016-059777

(51) Int. Cl.
*B29C 70/20* (2006.01)
*F16L 9/12* (2006.01)
(Continued)

(52) U.S. Cl.
CPC ............ *B29C 70/207* (2013.01); *B29C 53/58* (2013.01); *B29C 53/582* (2013.01); *B29C 70/30* (2013.01);
(Continued)

(58) Field of Classification Search
CPC ....... B29C 70/207; B29C 70/30; B29C 53/58; B29C 53/582; B29C 70/32; B32B 1/02;
(Continued)

(56) References Cited

U.S. PATENT DOCUMENTS 3,796,624 A  *  3/1974  Farnam et al. ......... B29C 70/04
                                                      156/436
4,456,495 A  *  6/1984  Doellinger ............... D06B 1/14
                                                      156/166
(Continued)

FOREIGN PATENT DOCUMENTS

CN      103791174 A      5/2014
JP      H07290591 A     11/1995
(Continued)

OTHER PUBLICATIONS

Notice of Grounds of Rejection issued in Japanese Application No. JP2016059777 dated Jan. 7, 2020.
(Continued)

*Primary Examiner* — Yan Lan
(74) *Attorney, Agent, or Firm* — Troutman Sanders LLP; James E. Schutz; Micah B. Hensley

(57) ABSTRACT

A fiber-reinforced member includes: a base member having a tubular region with an outer circumferential surface extending along and substantially in parallel with an axial direction; and a fiber-reinforced resin layer constituted of a tow prepreg wound in an overlapping manner to cover the outer circumferential surface of the base member along a predetermined direction crossing the axial direction when viewed in a radial direction of the base member, the tow prepreg serving as a widened tape-like member. The tape-like member constituting the fiber-reinforced resin layer has a portion having a fiber line extending along a direction crossing the predetermined direction. A size of a width of the tape-like member constituting the fiber-reinforced resin layer is not less than 100 times and not more than 400 times as large as a size of a thickness of the tape-like member constituting the fiber-reinforced resin layer in the radial direction.

10 Claims, 16 Drawing Sheets

(51) Int. Cl.
*B32B 5/12* (2006.01)
*B32B 37/20* (2006.01)
*B32B 1/02* (2006.01)
*B29C 70/30* (2006.01)
*B32B 15/14* (2006.01)
*B32B 5/26* (2006.01)
*B32B 27/12* (2006.01)
*F16L 9/128* (2006.01)
*B29C 53/58* (2006.01)
*B29C 70/32* (2006.01)
*B32B 1/08* (2006.01)
*B32B 7/03* (2019.01)
*F16L 9/16* (2006.01)
*B29K 63/00* (2006.01)
*B29K 307/04* (2006.01)
*B29L 23/00* (2006.01)
*B29L 31/00* (2006.01)

(52) U.S. Cl.
CPC ............... *B29C 70/32* (2013.01); *B32B 1/02* (2013.01); *B32B 1/08* (2013.01); *B32B 5/12* (2013.01); *B32B 5/26* (2013.01); *B32B 7/03* (2019.01); *B32B 15/14* (2013.01); *B32B 27/12* (2013.01); *B32B 37/203* (2013.01); *F16L 9/12* (2013.01); *F16L 9/121* (2013.01); *F16L 9/128* (2013.01); *F16L 9/16* (2013.01); *B29K 2063/00* (2013.01); *B29K 2307/04* (2013.01); *B29L 2023/22* (2013.01); *B29L 2031/712* (2013.01); *B32B 2260/021* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2305/076* (2013.01); *B32B 2307/50* (2013.01); *B32B 2307/546* (2013.01); *B32B 2307/732* (2013.01); *B32B 2313/04* (2013.01); *B32B 2363/00* (2013.01); *B32B 2439/40* (2013.01); *B32B 2597/00* (2013.01)

(58) Field of Classification Search
CPC ........ B32B 2260/021; B32B 2260/046; B32B 2305/076; B32B 2313/04; B32B 2363/00; B32B 2439/40; B32B 2597/00; B32B 37/203; B32B 5/12; B32B 15/14; B32B 1/08; B32B 2260/203; B32B 2262/0269; B32B 2262/101; B32B 2262/106; B32B 2307/50; B32B 2307/546; B32B 2307/732; B32B 27/12; B32B 5/26; B32B 7/03; B29K 2063/00; B29K 2307/04; F16L 9/12; F16L 9/121; F16L 9/128; F16L 9/16; B29L 2023/22; B29L 2031/712
See application file for complete search history.

(56) References Cited

U.S. PATENT DOCUMENTS

| | | |
|---|---|---|
| 2003/0151171 A1 | 8/2003 | LeBreton et al. |
| 2012/0236484 A1 | 9/2012 | Miyake |
| 2018/0036919 A1* | 2/2018 | Zhang ................ B29C 41/003 |

FOREIGN PATENT DOCUMENTS

| | | | |
|---|---|---|---|
| JP | 2003260717 A | | 9/2003 |
| JP | 2008304038 A | | 12/2008 |
| JP | 2010-236587 A | | 10/2010 |
| JP | 2010236587 | * | 10/2010 |
| JP | 2011093276 A | | 5/2011 |
| JP | 2011119831 A | | 6/2011 |
| JP | 2013002546 A | | 1/2013 |

OTHER PUBLICATIONS

Decision for Rejection issued in Japanese Application No. JP2016059777 dated Apr. 7, 2020.

* cited by examiner

FIBER-REINFORCED MEMBER AND METHOD FOR MANUFACTURING SAME

CROSS-REFERENCE TO RELATED APPLICATION

This nonprovisional application claims priority to Japanese Patent Application No. 2016-059777 filed on Mar. 24, 2016, with the Japan Patent Office, the entire contents of which are hereby incorporated by reference.

BACKGROUND OF THE INVENTION

Field of the Invention

The present invention relates to a fiber-reinforced member and a method for manufacturing the fiber-reinforced member, particularly, a fiber-reinforced member having a hollow tubular region and a method for manufacturing such a fiber-reinforced member.

Description of the Background Art

Japanese Patent Laying-Open No. 2010-236587 discloses an FRP pressure vessel having an FRP (fiber-reinforced plastic) laminate structure formed by winding, around a liner, a carbon fiber impregnated with a resin. The FRP laminate structure is configured as a helical winding layer having an orientation angle of 45° to 60° relative to the axial direction. This FRP laminate structure has a hollow tubular region.

SUMMARY OF THE INVENTION

Under application of an internal pressure of a predetermined value or more, a conventional FRP pressure vessel is failed due to occurrence of delamination in the FRP laminate structure. Moreover, a pipe-like FRP laminate structure having a hollow tubular region is compressively failed under application of external force.

The inventors have realized a fiber-reinforced member in which occurrence of delamination is suppressed as compared with the conventional FRP pressure vessel. Moreover, the inventors have realized a fiber-reinforced member suppressed from being compressively failed as compared with the conventional pipe-like fiber-reinforced member. Thus, a main object of the present invention is to provide a fiber-reinforced member having a higher strength than that of the conventional fiber-reinforced member.

A fiber-reinforced member according to the present invention includes: a base member having a tubular region with an outer circumferential surface extending along and substantially in parallel with an axial direction; and a fiber-reinforced resin layer constituted of a tow prepreg wound in an overlapping manner to cover the outer circumferential surface of the base member along a predetermined direction crossing the axial direction when viewed in a radial direction of the base member, the tow prepreg serving as a widened tape-like member. The tape-like member constituting the fiber-reinforced resin layer has a portion having a fiber line extending along a direction crossing the predetermined direction. A size of a width of the tape-like member constituting the fiber-reinforced resin layer is not less than 100 times and not more than 400 times as large as a size of a thickness of the tape-like member constituting the fiber-reinforced resin layer in the radial direction.

In the fiber-reinforced member, the fiber-reinforced resin layer includes: a first fiber-reinforced resin layer constituted of the tape-like member wound at a first angle relative to the axial direction when viewed in the radial direction of the base member; and a second fiber-reinforced resin layer constituted of the tape-like member wound at a second angle relative to the axial direction when viewed in the radial direction, the second angle being different from the first angle positively and negatively. The tape-like member constituting the first fiber-reinforced resin layer crosses the tape-like member constituting the second fiber-reinforced resin layer when viewed in the radial direction of the base member. The tape-like member constituting the first fiber-reinforced resin layer has a first fiber line extending along a direction crossing a direction represented by the first angle. The tape-like member constituting the second fiber-reinforced resin layer has a second fiber line extending along a direction crossing a direction represented by the second angle. A size of a width of the tape-like member constituting the first fiber-reinforced resin layer is not less than 100 times and not more than 400 times as large as a size of a thickness of the tape-like member constituting the first fiber-reinforced resin layer. A size of a width of the tape-like member constituting the second fiber-reinforced resin layer is not less than 100 times and not more than 400 times as large as a size of a thickness of the tape-like member constituting the second fiber-reinforced resin layer.

In the fiber-reinforced member, each of the first fiber-reinforced resin layer and the second fiber-reinforced resin layer has a resin content of not less than 29 weight % and not more than 32 weight %.

An absolute value of each of the first angle and the second angle is preferably not less than 30° and not more than 80°.

In the fiber-reinforced member, the first fiber-reinforced resin layer and the second fiber-reinforced resin layer are preferably layered alternately in the radial direction of the tubular region.

In the fiber-reinforced member according to another example of the present invention, the tape-like member constituting the fiber-reinforced resin layer is wound such that one of a pair of loops adjacent to each other in the wound tape-like member in a direction along the axial direction overlaps with at least a portion of the other of the pair of loops.

In the fiber-reinforced member, on the outer circumferential surface, the first fiber-reinforced resin layer preferably forms a third angle of not less than 30° and not more than 80° relative to a central line extending along the axial direction when viewed in the radial direction of the base member.

In the fiber-reinforced member, the base member preferably includes a third fiber-reinforced resin layer. The third fiber-reinforced resin layer has a third fiber bundle, and a third angle formed by an extending direction of the third fiber bundle relative to the axial direction is different from the first angle.

In the fiber-reinforced member, the base member is a hollow tank member.

In the fiber-reinforced member, the base member is a pipe-like member.

A method for manufacturing a fiber-reinforced member according to the present invention includes: preparing a base member having a tubular region with an outer circumferential surface extending along and substantially in parallel with an axial direction; winding a tow prepreg on the outer circumferential surface of the base member, the tow prepreg serving as a widened tape-like member; and thermally curing the tape-like member. In winding, the tape-like member is formed by widening the tow prepreg such that a size of a width of the tape-like member becomes not less than 100 times and not more than 400 times as large as a size of a thickness of the tape-like member in a radial direction of the base member, and the tape-like member is then wound in an overlapping manner to cover the outer circumferential surface of the base member along a predetermined direction crossing the axial direction when the base member is viewed in the radial direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
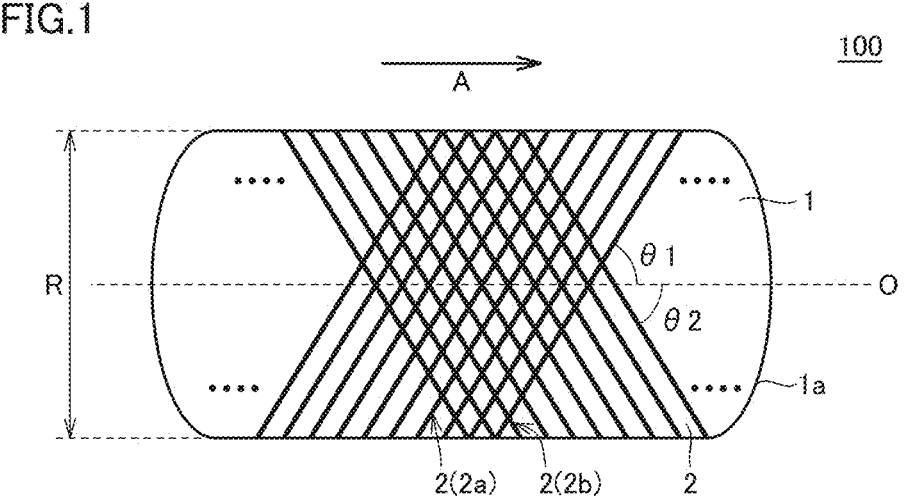
FIG. 1 is a schematic side view showing a fiber-reinforced member according to a first embodiment.

The following describes embodiments of the present invention with reference to figures. It should be noted that in the below-described figures, the same or corresponding portions are given the same reference characters and are not described repeatedly.

First Embodiment

<Configuration of Fiber-Reinforced Member>

With reference to FIG. 1, the following describes a fiber-reinforced member 100 according to a first embodiment. Fiber-reinforced member 100 is a pressure vessel (tank member). Fiber-reinforced member 100 mainly includes: a base member 1; and a first fiber-reinforced resin layer (first FRP layer 2a) and a second fiber-reinforced resin layer (second FRP layer 2b) both formed to surround base member 1.

As shown in FIG. 1, base member 1 is a hollow tank member, and has a storage space formed therein. Base member 1 has a tubular region. The tubular region of base member 1 is formed to have a center axis corresponding to an axis O and to have an outer circumferential surface extending along and substantially in parallel with an axial direction A (direction in which axis O extends). Here, the expression "substantially in parallel" refers to a state in which an orientation angle relative to axial direction A falls within a range of ±5°. Here, it is assumed that a negative (minus) orientation angle is represented by an angle clockwisely formed relative to axial direction A, whereas a positive (plus) orientation angle is represented by an angle counterclockwisely formed relative to axial direction A. Base member 1 is composed of at least one material selected from a group consisting of a metal, a general resin such as a polyethylene resin or a polypropylene resin, and an FRP, for example. When base member 1 is configured as, for example, an FRP layer laminate each constituted of a tow prepreg tape, a direction (angle relative to axial direction A) in which the tow prepreg tape is wound is different from a direction in which a tow prepreg tape constituting each of below-described first FRP layer 2a and second FRP layer 2b is wound, for example. An exemplary winding of the tow prepreg tape of base member 1 is a so-called hoop winding.

As shown in FIG. 1, first FRP layer 2a and second FRP layer 2b are formed on the outer circumferential surface of the tubular region of base member 1. First FRP layer 2a and second FRP layer 2b are portions of a helical layer in which one widened tow prepreg tape is helically wound around base member 1, and are different from each other in directions in which the widened tow prepreg tape is wound. Hereinafter, an extending direction of first FRP layer 2a will be referred to as a "first direction", whereas an extending direction of second FRP layer 2b will be referred to as a "second direction". The tow prepreg tape is an elongated tape-like member constituted of a widened tow prepreg, and is a fiber material impregnated with a resin. First FRP layer 2a and second FRP layer 2b are helically formed on the tubular region of base member 1. First FRP layer 2a and second FRP layer 2b are formed to be layered alternately in the radial direction of the tubular region of base member 1. When the number of times of layering each of first FRP layer 2a and second FRP layer 2b is n, i.e., when the number of times of layering first FRP layer 2a and second FRP layer 2b is 2 n, it is defined that the number of times of winding the tow prepreg tape is 2 n. Such a manner of winding is referred to as "2 n windings". The outer shape of each of first FRP layer 2a and second FRP layer 2b is originated from the outer shape of the tow prepreg tape, and can be identified through an appropriate cross section observation, for example.

As shown in FIG. 1, first FRP layer 2a and second FRP layer 2b are formed to cross each other when viewed in a radial direction of base member 1 (hereinafter, simply referred to as "radial direction"). Stated differently, on the outer circumferential surface, intersections between first FRP layer 2a and second FRP layer 2b are formed on a central line (straight line overlapping with axis O) extending along axial direction A when viewed in the radial direction of base member 1. First FRP layer 2a and second FRP layer 2b are formed to sandwich a portion of the central line therebetween in the circumferential direction of base member 1. The portion of the central line is located at the one end 1a side relative to each intersection in axial direction A of the tubular region. On this occasion, first FRP layer 2a and second FRP layer 2b are formed such that a distance therebetween in the circumferential direction becomes gradually longer as they are closer to the one end side from the intersection. Preferably, first FRP layer 2a and second FRP layer 2b, which cross each other at the intersection overlapping with axis O when viewed in the radial direction of base member 1, are substantially in a mirror-image relation with each other relative to axis O.

First FRP layer 2a is formed to have a first angle $\theta 1$ relative to axial direction A when viewed in the radial direction of base member 1. Second FRP layer 2b is formed to have a second angle $\theta 2$ relative to axial direction A when viewed in the radial direction of base member 1. First angle $\theta 1$ is an angle, formed at the intersection, between a portion of the central line and a portion of first FRP layer 2a located at the one end 1a side relative to the intersection. Second angle $\theta 2$ is an angle, formed at the intersection, between a portion of the central line and a portion of second FRP layer 2b located at the one end 1a side relative to the intersection. Each of first angle $\theta 1$ and second angle $\theta 2$ is not less than 30° and not more than 80°. First angle $\theta 1$ and second angle $\theta 2$ may be changed depending on locations of first FRP layer 2a and second FRP layer 2b as long as they fall within the above-described numeric value range. In other words, each of the first and second directions may have different orientation angles relative to axial direction A. For example, first FRP layer 2a and second FRP layer 2b formed on regions near the both ends of the tubular region of base member 1 in axial direction A have first angle $\theta 1$ and second angle $\theta 2$ larger than those of first FRP layer 2a and second FRP layer 2b formed on regions other than the both ends of the tubular region of base member 1.

Figure 2A:
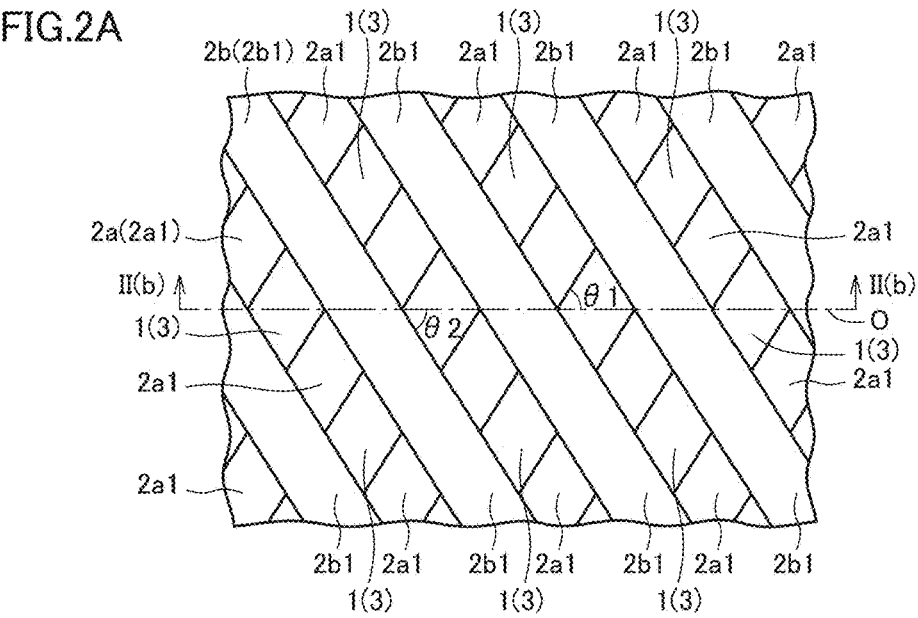
FIG. 2A is a schematic plan view showing only portions of first and second fiber-reinforced resin layers constituted of a tow prepreg tape wound in first and second rounds of winding in the first and second fiber-reinforced resin layers of the fiber-reinforced member according to the first embodiment.
Figure 2B:
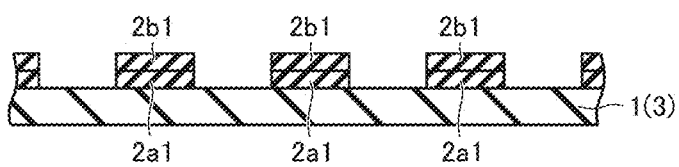
FIG. 2B is a schematic cross sectional view showing a configuration of a portion along a II (b)-II (b) line in FIG. 2A.
Figure 2C:
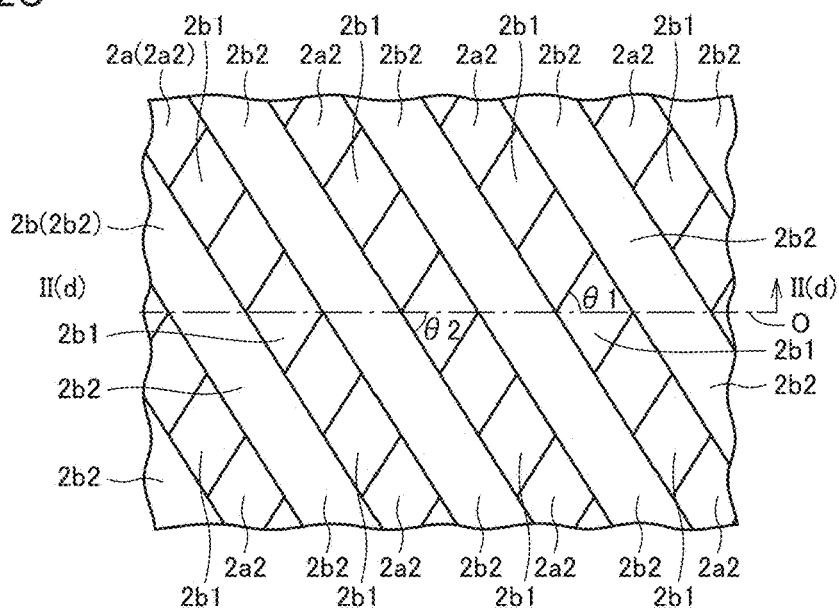
FIG. 2C is a schematic plan view showing portions of the first and second fiber-reinforced resin layers constituted of the tow prepreg tape wound in first to fourth rounds of winding in the first and second fiber-reinforced resin layers of the fiber-reinforced member according to the first embodiment.
Figure 2D:
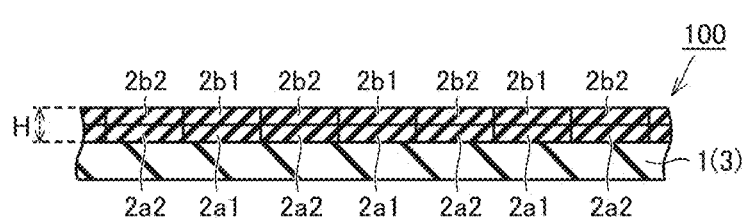
FIG. 2D is a schematic cross sectional view showing a configuration of a portion along a II (d)-II (d) line in FIG. 2C.

As shown in FIG. 2A and FIG. 2B, first FRP layer 2a and second FRP layer 2b respectively include: a first FRP layer 2a1 constituted of the tow prepreg tape wound in a first round of winding; and a second FRP layer 2b1 constituted of the tow prepreg tape wound in a second round of winding. As shown in FIG. 2C and FIG. 2D, first FRP layer 2a and second FRP layer 2b respectively include: a first FRP layer 2a2 including the tow prepreg tape wound in a third round of winding; and a second FRP layer 2b2 including the tow prepreg tape wound in a fourth round of winding. Here, the "round of winding" corresponds to a change in the winding direction of the tow prepreg tape between the first direction and the second direction. First FRP layer 2a1 is constituted of the tow prepreg tape wound for the first time on base member 1 along the first direction. Second FRP layer 2b1 is constituted of the tow prepreg tape wound for the first time along the second direction as a result of changing the winding direction after winding, in the first direction, the tow prepreg tape constituting first FRP layer 2a1. First FRP layer 2a2 is constituted of the tow prepreg tape wound for the second time in the first direction as a result of changing the winding direction after winding, along the second direction, the tow prepreg tape constituting second FRP layer 2b1. Second FRP layer 2b2 is constituted of the tow prepreg tape wound for the second time along the second direction as a result of changing the winding direction after winding, in the first direction, the tow prepreg tape constituting first FRP layer 2a2.

As shown in FIG. 2A to FIG. 2D, each of first FRP layer 2a and second FRP layer 2b has an equal width in axial direction A. Further, respective intervals are equal between adjacent portions of first FRP layer 2a1, between adjacent portions of first FRP layer 2a2, between adjacent portions of second FRP layer 2b1, and between adjacent portions of second FRP layer 2b2 in axial direction A, for example. The respective intervals between the portions of first FRP layer 2a1, between the portions of first FRP layer 2a2, between the portions of second FRP layer 2b1, and between the portions of second FRP layer 2b2 are equal to their respective widths in axial direction A, for example. As shown in FIG. 2B, first FRP layer 2a1 and second FRP layer 2b1 have portions layered such that the respective ends thereof in axial direction A overlap with each other in the radial direction in an arbitrary cross section along the radial direction, for example. Similarly, as shown in FIG. 2D, first FRP layer 2a2 and second FRP layer 2b2 have portions layered such that the respective ends thereof in axial direction A overlap with each other in the radial direction in an arbitrary cross section along the radial direction, for example. In the cross section, each of the thicknesses of first FRP layer 2a and second FRP layer 2b in the radial direction has a maximum value.

The configuration of each of first FRP layer 2a and second FRP layer 2b shown in FIG. 2A to FIG. 2D is just exemplary and is not limited to this. An interval between portions of a layer constituted of the tow prepreg tape wound in the same round of winding (for example, between the portions of first FRP layer 2a1 or between the portions of second FRP layer 2b2) in first FRP layer 2a and second FRP layer 2b may be different from the width of each of first FRP layer 2a and second FRP layer 2b, for example. In this case, first FRP layer 2a and second FRP layer 2b respectively have a portion layered such that first FRP layer 2a1 overlaps with first FRP layer 2a2 in the radial direction, and a portion layered such that second FRP layer 2b1 overlaps with second FRP layer 2b2 in the radial direction. In such a case, in the arbitrary cross section along the radial direction, the laminate of first FRP layer 2a and second FRP layer 2b has an outermost surface formed to have irregularity in the radial direction. Therefore, the thickness of the whole of the laminate in the radial direction has a portion indicating the maximum value and a portion indicating the minimum value.

Figure 3:
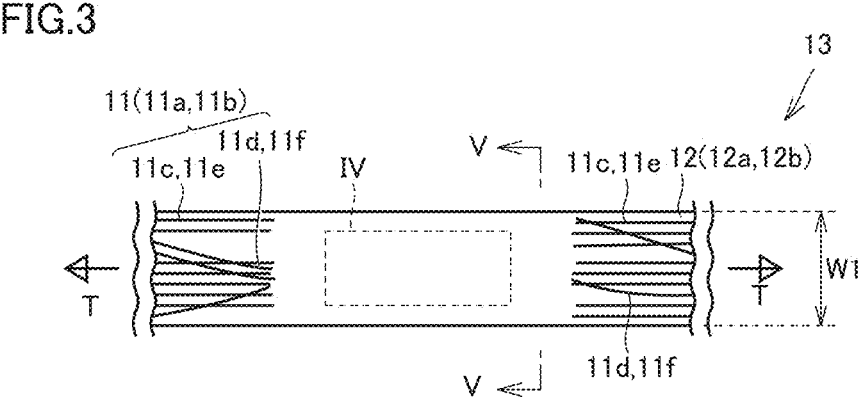
FIG. 3 is a schematic plan view showing a portion of a widened tape-like member constituting the fiber-reinforced member according to the first embodiment.
Figure 4:
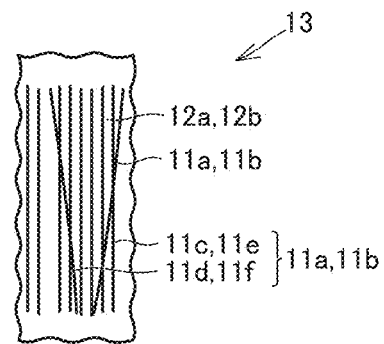
FIG. 4 is an enlarged view of a region IV in FIG. 3.
Figure 5:
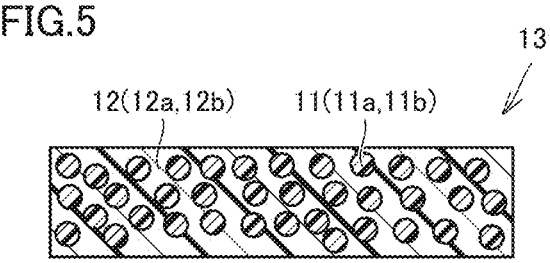
FIG. 5 is a schematic cross sectional view showing a configuration of a portion along a V-V line in FIG. 3.

Each of FIG. 3 and FIG. 4 is a partial plan view showing an external shape of the widened tape-like member before forming first FRP layer 2a and second FRP layer 2b. FIG. 5 is a partial cross sectional view of the widened tape-like member before forming first FRP layer 2a and second FRP layer 2b. With reference to FIG. 3 to FIG. 5, the widened tape-like member before forming first FRP layer 2a includes: a first fiber bundle 11a constituted of widened tow fibers; and a first resin portion 12a composed of a resin with which first fiber bundle 11a is impregnated. The widened tape-like member before forming second FRP layer 2b includes: a second fiber bundle 11b constituted of widened tow fibers; and a second resin portion 12b composed of a resin with which second fiber bundle 11b is impregnated. Each of first fiber bundle 11a and second fiber bundle 11b is constituted of at least one fiber selected from a group consisting of a carbon fiber, a glass fiber, an aramid fiber, and a vulcanized fiber. For example, each of first fiber bundle 11a and second fiber bundle 11b is constituted of a carbon fiber. Examples of the material of each of first resin portion 12a and second resin portion 12b include an epoxy resin, a modified epoxy resin, an unsaturated polyester resin, a polyamide resin, or a phenol resin. The resin content of the widened tape-like member to serve as first FRP layer 2a and second FRP layer 2b is not less than 30 weight % and not more than 33 weight %, for example. It should be noted that the resin content of each of first FRP layer 2a and second FRP layer 2b is not less than 29 weight % and not more than 32 weight %. It should be also noted that the respective resin contents of first FRP layer 2a and second FRP layer 2b can be determined based on a change in weight before and after removing only first resin portion 12a and second resin portion 12b from first FRP layer 2a and second FRP layer 2b.

In first FRP layer 2a and second FRP layer 2b, the first fiber bundle and second fiber bundle have the same configurations as those of the first fiber bundle and second fiber bundle in the widened tape-like member before forming first FRP layer 2a and second FRP layer 2b shown in FIG. 3 to FIG. 5. In first FRP layer 2a and second FRP layer 2b, the first fiber bundle and second fiber bundle have such states that tow fibers are widened. Specifically, first FRP layer 2a and second FRP layer 2b have the following feature.

As shown in FIG. 3 and FIG. 4, first fiber bundle 11a includes: a first extending portion 11c extending in the first direction; and a first obliquely crossing portion 11d extending in a direction crossing the first direction. First extending portion 11c is constituted of a small fiber bundle in which filaments (bundles of a plurality of individual fibers) in the tow fibers are maintained to be bound to one another. First obliquely crossing portion 11d is constituted of at least one bundle of first fiber lines (one filament) loosened from the bound filaments in the tow fibers, for example. A part of the first fiber lines in the first direction extend in the first direction to constitute first extending portion 11c. Another part of the first fiber lines in the first direction extend in the direction crossing the first direction to constitute first obliquely crossing portion 11d.

As shown in FIG. 3 and FIG. 4, second fiber bundle 11b includes the same configuration as that of the first fiber bundle. Second fiber bundle 11b includes: a second extending portion 11e extending in the second direction; and a second obliquely crossing portion 11f extending in a direction crossing the second direction. Second extending portion 11e is constituted of a small fiber bundle in which filaments in the tow fibers are maintained to be bound to one another. Second obliquely crossing portion 11f is constituted of at least one bundle of second fiber lines (one filament) loosened from the bound fibers in the tow fibers, for example. A part of the second fiber lines in the second direction extend in the second direction to constitute second extending portion 11e. Another part of the second fiber lines in the second direction extend in the direction crossing the second direction to constitute second obliquely crossing portion 11f.

A plurality of first obliquely crossing portions 11d are formed on first FRP layer 2a at a certain frequency in the first direction. A plurality of second obliquely crossing portions 11f are formed on second FRP layer 2b at a certain frequency in the second direction. For example, by observing first FRP layer 2a or second FRP layer 2b using an optical microscope (magnification of ×50), at least one first obliquely crossing portion 11d or second obliquely crossing portion 11f can be identified in a microscopic field of 100 cm$^2$.

The size of width W1 of the tape-like member constituting first FRP layer 2a in the direction perpendicular to the first direction (width of the tape-like member constituting second FRP layer 2b in the direction perpendicular to the second direction) is not less than 100 times and not more than 400 times as large as the size of a thickness (average thickness) h (not shown) of the tape-like member constituting each of first FRP layer 2a and second FRP layer 2b in the radial direction. Width W1 of the tape-like member constituting each of first FRP layer 2a and second FRP layer 2b can be determined by multiplying sin θ$_1$ by the width of the tape-like member in axial direction A on a cross section along axial direction A, wherein sin θ$_1$ is sine of first angle θ1 and the tape-like member has been thermally cured after being wound on the tubular region of base member 1, for example. Moreover, width W1 can be determined by multiplying sin θ$_2$ by the width of the tape-like member in axial direction A on a cross section along axial direction A, wherein sin θ$_2$ is sine of second angle θ2 and the tape-like member has been thermally cured after being wound on the tubular region of base member 1, for example. The thickness (average thickness) h of the tape-like member constituting each of first FRP layer 2a and second FRP layer 2b in the radial direction can be determined by dividing maximum value H of the thickness of the laminate of the tape-like member by number n of times of layering at the portion corresponding to maximum value H in the cross section perpendicular to axial direction A, wherein the tape-like member has been thermally cured after being wound on the tubular region of base member 1. In the exemplary configuration shown in FIG. 2D, each of the thickness of the tape-like member constituting first FRP layer 2a1 and the thickness of the tape-like member constituting second FRP layer 2b1 has the maximum value, and number n of times of layering is 2. In this case, thickness (average thickness) h of the tape-like member constituting each of first FRP layer 2a and second FRP layer 2b in the radial direction is H/2.

It should be noted that when the interval between the portions of the tow prepreg tape layered in the same round of winding in each of first FRP layer 2a and second FRP layer 2b is not equal to the width of each of first FRP layer 2a and second FRP layer 2b, the thickness of the laminate of each of first FRP layer 2a and second FRP layer 2b in the radial direction includes the portion indicating the maximum value, and the portion indicating the minimum value as described above. In this case, it is assumed that maximum value H of the thickness of the laminate of the tape-like member is represented by the thickness of a laminate structure, involving the expected number n of times of layering, at a region having the maximum thickness among regions in each of which the laminate structure is identified in an arbitrary cross section along the radial direction. Thickness (average thickness) h of the tape-like member constituting each of first FRP layer 2a and second FRP layer 2b in the radial direction can be determined by dividing maximum value H by number n of times of layering.

First FRP layer 2a and second FRP layer 2b each having the above feature can be formed in the following manner, for example.

First, tow fibers each having a bundle of a plurality of carbon fibers are prepared. Next, contact pressure is applied to the tow fibers by an appropriate method. Accordingly, frictional force is generated between each of the tow fibers and a member (for example, a roll) that applies the contact pressure to the tow fiber, whereby the bound carbon fibers in the tow fibers are partially loosened to result in widen tow fibers. The fiber bundle thus including the widen tow fibers is provided with: a portion extending along the extending direction of the fiber bundle (portion to serve as first extending portion 11c); and a portion extending (obliquely crossing) in the direction crossing the extending direction of the fiber bundle (portion to serve as first obliquely crossing portion 11d). Next, the widened fiber bundle is impregnated with a resin. In this way, a tow prepreg (tow prepreg tape) is formed to serve as a tape-like member having a flat shape in a cross section perpendicular to the extending direction. Next, the tow prepreg is helically wound on the tubular region of base member 1. In doing so, the tow prepreg is first helically wound under application of predetermined tension by pulling the tow prepreg to extend along the first direction. Then, the tow prepreg tape is helically wound under application of predetermined tension by pulling the tow prepreg tape to extend along the second direction. By repeating this 2 n times, a laminate is formed in which the layer obtained by layering the tow prepreg tape for n times to extend in the first direction and the layer obtained by layering the tow prepreg for n times to extend in the second direction are formed alternately on the tubular region of base member 1. Next, the tow prepreg tape laminate is heated to thermally cure the resin of the tow prepreg tape. In this way, first FRP layer 2a and second FRP layer 2b are formed.

It should be noted that the widened tow prepreg tape described above may be formed by applying contact pressure to the tow prepreg tape including the tow fibers impregnated with the resin. Namely, first FRP layer 2a and second FRP layer 2b in the first embodiment may be formed in a so-called dry method using the tow prepreg tape widened as described above.

A method for manufacturing fiber-reinforced member 100 mainly includes: preparing base member 1; forming the tow prepreg tape as described above; and helically winding the tow prepreg tape on the tubular region of base member 1. In this way, fiber-reinforced member 100 can be manufactured in which first FRP layer 2a and second FRP layer 2b are formed on the tubular region of base member 1.

A plurality of first obliquely crossing portions 11d may be formed in the width direction perpendicular to the first direction. A plurality of second obliquely crossing portions 11f may be formed in the width direction perpendicular to the second direction. Moreover, first obliquely crossing portion 11d may be constituted of a plurality of first fiber lines (filaments) and second obliquely crossing portion 11f may be constituted of a plurality of second fiber lines (filaments). Namely, each of first obliquely crossing portion 11d and second obliquely crossing portion 11f may be constituted of a small fiber bundle in which the fibers are maintained to be bound to one another in the tow fibers.

Moreover, fiber-reinforced member 100 may further include a hoop layer (not shown) constituted of a tow prepreg tape hoop-wound on first FRP layer 2a and second FRP layer 2b each serving as a helical layer. The hoop layer is formed to extend along a direction crossing axial direction A at an angle larger than first angle θ1 and second angle θ2 when viewed in the radial direction of base member 1.

<Function and Effect>

Next, the following describes function and effect of fiber-reinforced member 100. Fiber-reinforced member 100 includes: base member 1 having the tubular region with the outer circumferential surface extending along and substantially in parallel with axial direction A; and first FRP layer 2a constituted of the tape-like member wound to cover the outer circumferential surface of base member 1; and second FRP layer 2b constituted of the tape-like member wound to cover the outer circumferential surface. First FRP layer 2a and second FRP layer 2b are formed to cross each other when viewed in the radial direction of base member 1. When viewed in the radial direction of base member 1, first FRP layer 2a is formed to extend in the first direction crossing axial direction A at first angle $\theta_1$. When viewed in the radial direction, second FRP layer 2b is formed to extend in the second direction crossing axial direction A at second angle $\theta_2$. The first direction and the second direction are in a mirror-image relation with each other relative to axis O of base member 1 when viewed in the radial direction. Each of first angle $\theta_1$ and second angle $\theta_2$ is not less than 30° and not more than 80°. First FRP layer 2a includes: first fiber bundle 11a including the widened tow fibers (first tow fibers); and first resin portion 12a with which first fiber bundle 11a is impregnated. Second FRP layer 2b includes: second fiber bundle 11b including the widened tow fibers; and second resin portion 12b with which second fiber bundle 11b is impregnated. First fiber bundle 11a has the first fiber lines. A part of the first fiber lines in the first direction extend in the first direction, and another part of the first fiber lines in the first direction extends in a direction crossing the first direction. Second fiber bundle 11b has the second fiber lines. A part of the second fiber lines in the second direction extend in the second direction, and another part of the second fiber lines in the second direction extend in a direction crossing the second direction. The size of the width of the tape-like member constituting first FRP layer 2a in the direction perpendicular to the first direction is not less than 100 times and not more than 400 times as large as the size of the average thickness of the tape-like member constituting first FRP layer 2a, and the size of the width of the tape-like member constituting second FRP layer 2b in the direction perpendicular to the second direction is not less than 100 times and not more than 400 times as large as the size of the average thickness of the tape-like member constituting second FRP layer 2b.

The present inventors conducted an experiment for comparison in failure strength between the conventional fiber-reinforced member and fiber-reinforced member 100 according to the first embodiment in which the entire thickness of the fiber-reinforced resin layer constituted of the tow prepreg tape is uniform. As a result, it was confirmed that the failure strength (bursting pressure) of fiber-reinforced member 100 according to the first embodiment is improved significantly as compared with the conventional fiber-reinforced member. Details thereof will be described later in Examples.

The failure strength of fiber-reinforced member 100 is significantly improved presumably due to the following reason, for example.

Since each of first FRP layer 2a and second FRP layer 2b is constituted of the widened tow prepreg described above, the thickness of each of first FRP layer 2a and second FRP layer 2b is thinner than the thickness of the fiber-reinforced resin layer constituted of the conventional non-widened tow prepreg having a comparable fiber density in the cross section perpendicular to the extending direction. Moreover, assuming that the thickness of all the FRP layers is a predetermined thickness, the number of times of layering first FRP layer 2a and second FRP layer 2b in the thickness is larger than the number of times of layering in the conventional fiber-reinforced resin layer. Hence, when external force is applied to fiber-reinforced member 100 in the direction crossing each of the first direction and the second direction, a component of force obtained by, for example, dividing the external force by the number of times of layering is applied to each of first FRP layer 2a and second FRP layer 2b; however, the component of force is small because the number of times of layering is large. Accordingly, cracks are suppressed from being developed in first FRP layer 2a and second FRP layer 2b as compared with the conventional fiber-reinforced resin layer.

In each of first FRP layer 2a and second FRP layer 2b, the extending direction of the first fiber bundle is different from the extending direction of the second fiber bundle, thereby suppressing cracks from being developed via the adjacent FRP layers. Further, since the thickness thereof is thinner than that of the conventional fiber-reinforced resin layer, a distance is shorter in which cracks can be developed in the layering directions in first FRP layer 2a and second FRP layer 2b. Accordingly, stress concentration is small in each of first FRP layer 2a and second FRP layer 2b, thereby suppressing development of cracks as compared with the conventional fiber-reinforced resin layer.

That is, according to fiber-reinforced member 100, occurrence and development of cracks are suppressed as compared with the conventional fiber-reinforced member. Accordingly, in fiber-reinforced member 100, cracks are suppressed from being developed to result in delamination, even if each of first FRP layer 2a and second FRP layer 2b is provided with force that causes development of cracks to result in delamination in the conventional fiber-reinforced member. That is, the failure strength of fiber-reinforced member 100 is improved as compared with the conventional fiber-reinforced member.

In fiber-reinforced member 100, first FRP layer 2a and second FRP layer 2b are formed to be alternately layered in the radial direction of the tubular region. Hence, assuming that the helical layer has a predetermined thickness in each of fiber-reinforced member 100 and the conventional fiber-reinforced member both having the same contents of fiber and resin while fiber-reinforced member 100 is manufactured using the tow prepreg tape in which widened first fiber bundle 11a is impregnated with the resin as described above and the conventional fiber-reinforced member is manufactured using the tow prepreg tape in which the fiber bundle is not widened, the number of times of layering first FRP layer 2a and second FRP layer 2b, which constitute the helical layer, can be increased in fiber-reinforced member 100 as compared with the conventional fiber-reinforced member. Accordingly, the failure strength of fiber-reinforced member 100 is improved as compared with the conventional fiber-reinforced member.

The method for manufacturing the fiber-reinforced member according to the present embodiment includes: preparing base member 1 having the tubular region with the outer circumferential surface extending along and substantially in parallel with the axial direction; winding the widened tape-like member on the outer circumferential surface of base member 1; and thermally curing the tape-like member. In winding, the tape-like member is formed by widening the tow prepreg such that the size of the width of the tape-like member becomes not less than 100 times and not more than 400 times as large as the size of the thickness of the tape-like member in the radial direction of the base member, and the tape-like member is then wound in an overlapping manner to cover the outer circumferential surface of the base member along the predetermined direction crossing the axial direction when the base member is viewed in the radial direction. Furthermore, the winding in the method for manufacturing the fiber-reinforced member according to the present embodiment includes: winding the tape-like member at first angle $\theta1$ relative to the axial direction when the base member is viewed in the radial direction; and winding the tape-like member at second angle $\theta2$ relative to the axial direction, second angle $\theta2$ being different from first angle $\theta1$ positively and negatively. For example, when viewed in the radial direction of base member 1, the absolute value of first angle $\theta1$ of the tape-like member relative to the central line crossing the tape-like member and extending along axial direction A (straight line overlapping with axis O) on the outer circumferential surface is substantially equal to the absolute value of second angle $\theta2$ of the tape-like member relative to the central line crossing the tape-like member and extending along axial direction A (straight line overlapping with axis O) on the outer circumferential surface, and each of the absolute values of first angle $\theta1$ and second angle $\theta2$ is preferably not less than 30° and not more than 80°. In this way, fiber-reinforced member 100 according to the present embodiment can be manufactured.

In fiber-reinforced member 100, one of first FRP layer 2a and second FRP layer 2b may be layered without the other being interposed. For example, by winding the tow prepreg on the tubular region of base member 1 multiple times without changing the winding direction, fiber-reinforced member 100 may have a laminate structure portion constituted of only FRP layer 2a or only second FRP layer 2b.

With reference to FIG. 2A to FIG. 2D, the tubular region of base member 1 may be constituted of a metal, a resin, or a third fiber-reinforced resin layer (third FRP layer 3). When base member 1 is constituted of third FRP layer 3, third FRP layer 3 is formed using a tow prepreg or sheet prepreg wound around a liner (not shown), for example Third FRP layer 3 includes a third fiber bundle and a third resin portion with which the third fiber bundle is impregnated. The extending direction of the third fiber bundle preferably crosses the first direction and the second direction. Stated differently, an angle (not shown) of the extending direction of the third fiber bundle relative to axial direction A is different from first angle $\theta_1$ and second angle $\theta_2$. In this way, the extending directions of the fiber bundles in the respective fiber layers are different, thereby suppressing development of cracks via the adjacent fiber layers. As a result, the failure strength of fiber-reinforced member 100 can be further improved.

Third FRP layer 3 may be formed by winding (for example, hoop-winding), on a liner, a tow prepreg tape including widened tow fibers impregnated with a resin, or a widened tow prepreg tape.

Second Embodiment

<Configuration of Tubular Member>

Figure 6:
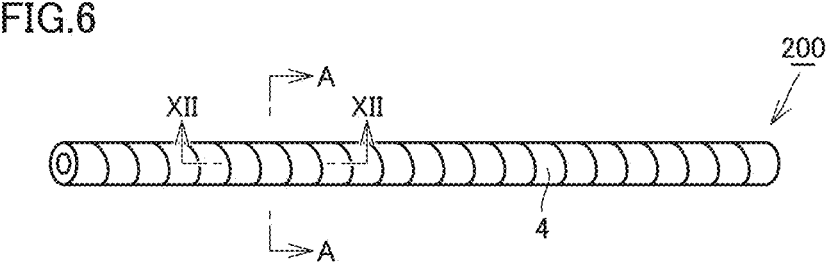
FIG. 6 is a schematic view showing an exemplary external appearance of a fiber-reinforced member 200 in a second embodiment.

With reference to FIG. 6, a fiber-reinforced member 200 of the present embodiment serves as a golf club shaft or pipe composed of, for example, a composite material of a carbon fiber and a resin. That is, fiber-reinforced member 200 has an outer diameter smaller than that of fiber-reinforced member 100 according to the first embodiment. Fiber-reinforced member 200 includes: a fourth FRP layer 4 serving as a first fiber-reinforced resin layer; and a fifth FRP layer 5 (see FIG. 7) serving as a third fiber-reinforced resin layer of a base member and located at the inner circumference side of the fourth FRP layer. Fourth FRP layer 4 is located at the outer circumference side, and is constituted of a tow prepreg tape. Fifth FRP layer 5 is located at the inner circumference side, and is constituted of a sheet prepreg tape. It should be noted that each of the fourth and fifth FRP layers is not limited to the above-described carbon fiber, and may be composed of a composite material of a resin and a glass fiber, an aramid fiber or a vulcanized fiber, for example. Moreover, the base member of fiber-reinforced member 200 may be composed of a metal, a plastic, or the like.

The tow prepreg tape is an elongated tape-like member constituted of a tow prepreg, and is a fiber material impregnated with a resin. This tow prepreg tape is wound around the center axis of the tubular member while moving in the extending direction (axial direction) of fiber-reinforced member 200, thus providing the configuration as fourth FRP layer 4. Specifically, the tow prepreg tape is wound such that the direction in which the tow prepreg tape extends in the form of a tape is (substantially, rather than completely as described below) along the circumference direction of the wound tow prepreg tape. It should be noted that in a below-described manufacturing process, a bar-like member such as a mandrel may be used as a core material around which the tow prepreg tape or the like is wound.

Figure 7:
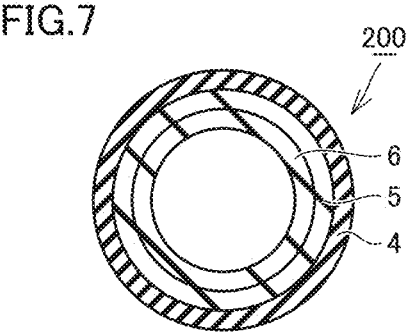
FIG. 7 is a schematic cross sectional view showing a first example of a configuration of a portion along an A-A line of FIG. 6.

With reference to FIG. 7, in a first example of the configuration of fiber-reinforced member 200 shown in FIG. 6, fifth FRP layer 5 constituted of a sheet prepreg is formed inwardly of fourth FRP layer 4 constituted of the tow prepreg tape. A sixth FRP layer 6 constituted of another sheet prepreg is wound inwardly of fifth FRP layer 5. Therefore, in FIG. 7, fiber-reinforced member 200 has a three-layer structure in which sixth FRP layer 6, fifth FRP layer 5, and fourth FRP layer 4 are layered in this order from the inside to the outside in the radial direction crossing a direction in which each member is wound. In other words, the sheet prepreg is further wound in contact with (to cover) the rear surface (inner side) of the sheet prepreg opposite to the front surface (outer side) of the sheet prepreg around which the tow prepreg tape is wound.

It should be noted that the tow prepreg tape is impregnated with a resin material having a much higher flowability than that of the sheet prepreg. Therefore, the tow prepreg tape has a much larger deformation amount than that of the sheet prepreg. Hence, when no external force is applied, the tow prepreg tape maintains its shape due to resin viscosity; however, when external force is applied, the tow prepreg tape is likely to be deformed in the width direction and the thickness direction.

Figure 8:
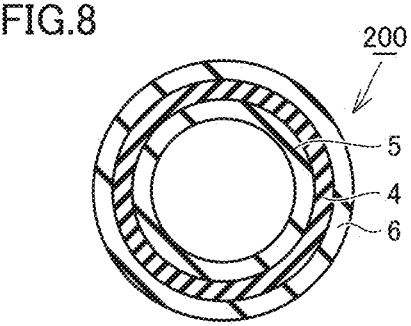
FIG. 8 is a schematic cross sectional view showing a second example of the configuration of the portion along the A-A line of FIG. 6.

With reference to FIG. 8, in a second example of the configuration of fiber-reinforced member 200 shown in FIG. 6, a sheet prepreg is wound inwardly of a tow prepreg tape, and a sheet prepreg is wound outwardly of the tow prepreg tape. Therefore, in FIG. 8, fiber-reinforced member 200 has a three-layer structure in which fifth FRP layer 5, fourth FRP layer 4, and sixth FRP layer 6 are layered in this order from the inside to the outside in the radial direction crossing the direction in which each member is wound. In other words, the sheet prepreg is wound to cover the front surface (outer side) of the tow prepreg tape.

Figure 9:
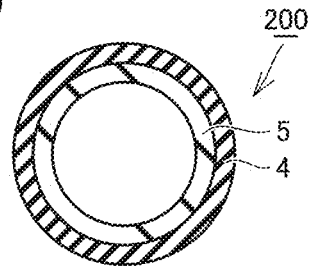
FIG. 9 is a schematic cross sectional view showing a third example of the configuration of the portion along the A-A line of FIG. 6.

With reference to FIG. 9, in a third example of the configuration of fiber-reinforced member 200 shown in FIG. 6, a sheet prepreg is wound inwardly of a tow prepreg tape. Therefore, in FIG. 9, fiber-reinforced member 200 has a two-layer structure in which fifth FRP layer 5 and fourth FRP layer 4 are layered in this order from the inside to the outside in the radial direction crossing the direction in which each member is wound.

Figure 10:
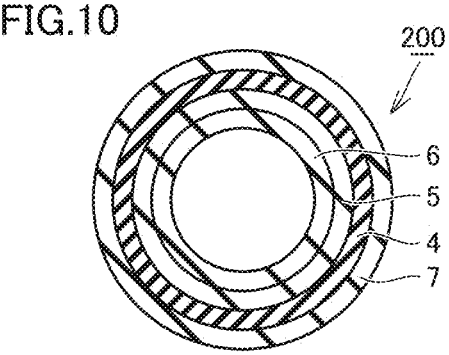
FIG. 10 is a schematic cross sectional view showing a fourth example of the configuration of the portion along the A-A line of FIG. 6.

With reference to FIG. 10, in a fourth example of the configuration of fiber-reinforced member 200 shown in FIG. 6, a sheet prepreg is further wound outwardly of the three-layer structure including the sheet prepreg, the sheet prepreg, and the tow prepreg tape in FIG. 7. Therefore, fiber-reinforced member 200 has a four-layer structure in total, i.e., sixth FRP layer 6, fifth FRP layer 5, fourth FRP layer 4, and a seventh FRP layer 7. Thus, fiber-reinforced member 200 may be configured such that four or more FRP layers in total are wound.

Figure 11:
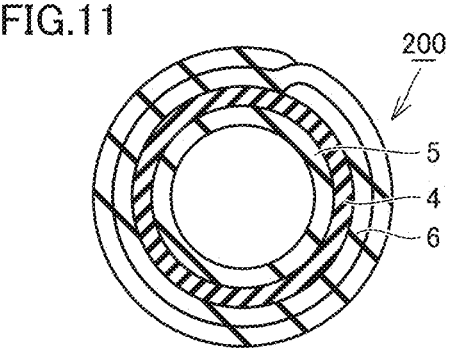
FIG. 11 is a schematic cross sectional view showing a fifth example of the configuration of the portion along the A-A line of FIG. 6.

With reference to FIG. 11, in a fifth example of the configuration of fiber-reinforced member 200 shown in FIG. 6, as with FIG. 8, a sheet prepreg, a tow prepreg tape, and a sheet prepreg are layered from the inside to the outside; however, the outermost sheet prepreg is wound to overlap with itself in the radial direction of fiber-reinforced member 200. As a result, fiber-reinforced member 200 has a four-layer structure in total, i.e., fifth FRP layer 5, fourth FRP layer 4, and two sixth FRP layers 6. Thus, fiber-reinforced member 200 may be configured such that four or more FRP layers in total are wound.

When the plurality of sheet prepreg layers are included as described above, the sheet prepreg layers can be oriented in different directions such that fibers of the respective sheet prepreg layers are appropriately oriented in a plurality of directions. Accordingly, desired strength properties required for fiber-reinforced member 200 can be appropriately provided, such as improved tensile strength, improved compressive strength in the radial direction in which they are wound, or improved torsional strength.

In each of these examples, the inner side relative to the innermost layer is hollow due to removal of the mandrel or the like serving as the core material used to form fiber-reinforced member 200, with the result that each of fifth FRP layer 5 and sixth FRP layer 6 constituted of the sheet prepregs has a tubular region.

Moreover, in the present embodiment, at least two FRP layers each constituted of a tow prepreg tape or the like are layered. Among them, as shown in FIG. 7 to FIG. 9, the tow prepreg tape is wound to cover the front surface (outer side) of the sheet prepreg. It should be noted that the sheet prepreg is not shown in FIG. 6.

Figure 12:
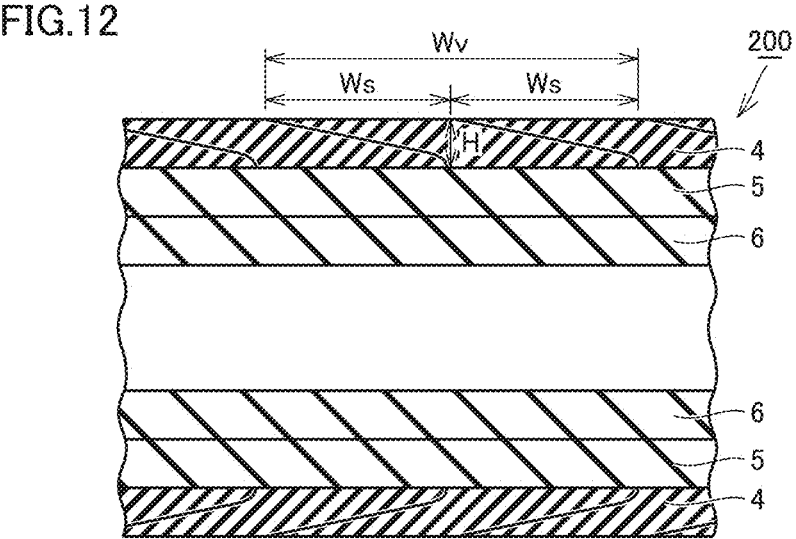
FIG. 12 is a schematic cross sectional view showing a configuration of a portion along a XII-XII line of FIG. 6 in the configuration of the first example of FIG. 7.

With reference to FIG. 12, for example, in fiber-reinforced member 200 of the first example shown in FIG. 7, the tow prepreg tape is wound such that one of a pair of loops adjacent to each other in the wound tow prepreg tape overlaps with at least a portion of the other of the pair in the direction along the leftward/rightward direction shown in FIG. 6, i.e., the axial direction of the tubular shape (for example, cylindrical shape). That is, fourth FRP layer 4 constituted of one loop of the tow prepreg tape shown in FIG. 12 is disposed such that a left side portion thereof lies on a portion of fourth FRP layer 4 constituted of one loop of the tow prepreg tape adjacent thereto at the left side.

FIG. 12 shows that fourth FRP layer 4 is layered to overlap with itself twice. In the present embodiment, it is defined that the number of times of winding the tow prepreg tape is n when the number of overlaps of fourth FRP layer 4 is n. Such a manner of winding will be referred to as "n winding(s)". For example, in FIG. 12, the number of times of winding the tow prepreg tape is "two", so that the manner of winding is "two windings". Moreover, the extending direction of the tow prepreg tape (itself) is inclined relative to the direction along the upward/downward direction of FIG. 12 (such that the tow prepreg tape extends from the upper left side to the lower right side in the figure). It should be noted that number n of times of winding the tow prepreg tape may be multiple to be three or more.

Accordingly, as shown in FIG. 6, the tow prepreg tape is wound such that the extending direction of the tape is not completely along the circumferential direction of the cylindrical shape, i.e., such that the tape itself extends in a direction slightly inclined relative to the circumferential direction of the cylindrical shape by a slight deviation of the winding in the direction along the axial direction of the cylindrical shape. As a result, the tow prepreg tape has a plurality of fiber lines 11 (see FIG. 3) extending along the extending direction of the tape itself, but is wound such that the extending direction of fiber line 11 is obliquely inclined relative to the direction along the axial direction of the cylindrical shape of fiber-reinforced member 200.

Next, the following describes a shape of fourth FRP layer 4 constituted of the tow prepreg tape. First, the thickness of fourth FRP layer 4 will be described with reference to FIG. 12. FIG. 12 shows a cross section (hereinafter, referred to as "axial cross section") of fiber-reinforced member 200 along the center axis of fiber-reinforced member 200.

As shown in FIG. 12, when fourth FRP layer 4 is formed by 2 windings, regions Ws having two overlaps of the tow prepreg tape appear repeatedly in fourth FRP layer 4 at the axial cross section. Assuming that an average value of the thicknesses of fourth FRP layer 4 in overlapping regions Ws represents an average thickness h of fourth FRP layer 4, average thickness h of fourth FRP layer 4 can be determined by dividing maximum value H of the thickness of fourth FRP layer 4 at the axial cross section by the number of times of layering fourth FRP layer 4 (number n of times of winding the tow prepreg tape).

Namely, the following relation is established among average thickness h of fourth FRP layer 4, maximum value H of the thickness of fourth FRP layer 4, and number n of times of layering fourth FRP layer 4:

$$h=H/n \qquad (1)$$

Figure 13:
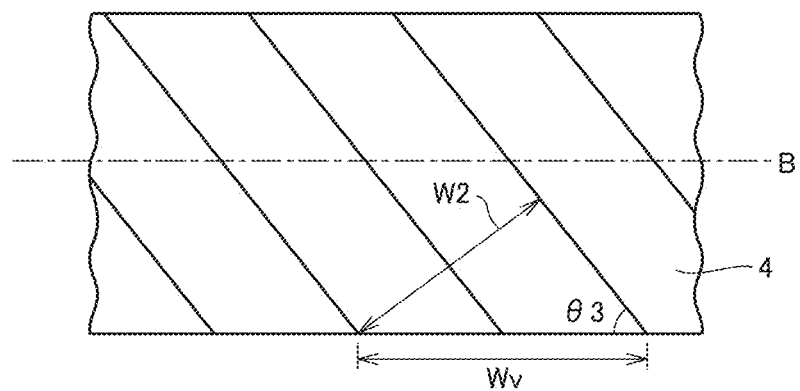
FIG. 13 shows an external appearance of a fourth FRP layer.

Next, the following describes a width of fourth FRP layer 4 with reference to FIG. 12 and FIG. 13. FIG. 13 shows a surface of fiber-reinforced member 200 obtained by 2 windings of the tow prepreg tape.

With reference to FIG. 12, in fourth FRP layer 4 at the axial cross section, an axial tape width Wv corresponding to one loop of the tow prepreg tape is exhibited. Here, as shown in FIG. 13, when the tow prepreg tape is wound around the center axis of fiber-reinforced member 200 at an angle θ3 (third angle), the following relation is established between axial width Wv of fourth FRP layer 4 and actual width W2 of fourth FRP layer 4, i.e., width W2 in the direction perpendicular to the extending direction of the tow prepreg:

$$W2=Wv\times\sin\theta3 \qquad (2)$$

As described above, average thickness h of fourth FRP layer 4 is obtained using the above-described formula (1) in accordance with maximum value H of the thickness of fourth FRP layer 4 obtained from the axial cross section of fiber-reinforced member 200 and the number of times of layering fourth FRP layer 4 (number n of times of winding the tow prepreg tape). Moreover, width W2 of fourth FRP layer 4 is obtained using the above-described formula (2) in accordance with axial width Wv of fourth FRP layer 4 obtained from the axial cross section of fiber-reinforced member 200 and winding angle θ3 of the tow prepreg tape. Moreover, in the product of the present invention, width W2 of fourth FRP layer 4 of fiber-reinforced member 200 is not less than 100 times and not more than 400 times as large as the size of average thickness h of fourth FRP layer 4 confirmed at the axial cross section of fiber-reinforced member 200.

When the tow prepreg tape is wound to form fiber-reinforced member 200, strong tension is applied to press the tow prepreg tape in the thickness direction into a deforming state, with the result that the tow prepreg tape is expanded in the axial direction. That is, force is applied to reduce tape average thickness h during the winding, thus resulting in a large axial tape width Wv at the axial cross section shown in FIG. 12.

Figure 14:
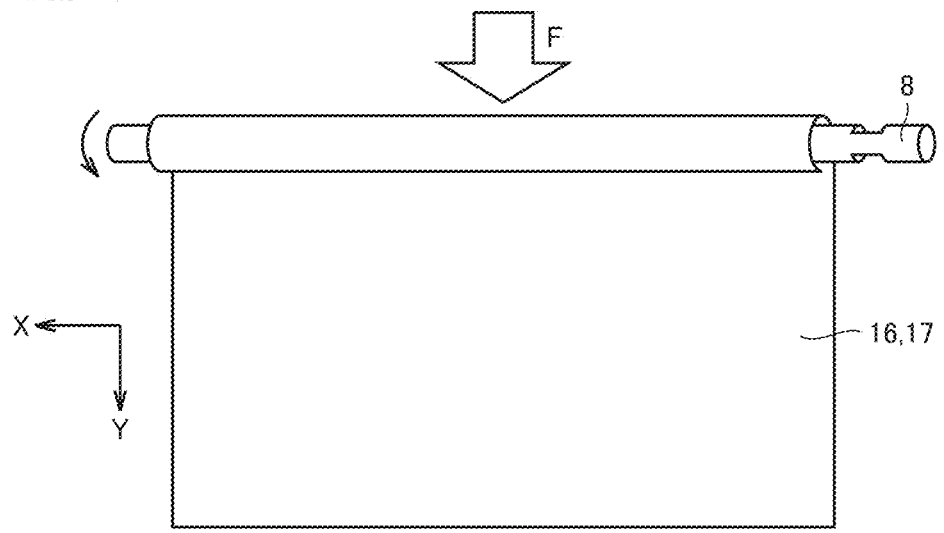
FIG. 14 is a schematic view showing a method for winding a sheet prepreg as a first step of a manufacturing method in the second embodiment.

Meanwhile, as shown in FIG. 14, unlike tow prepreg tape 13 (see FIG. 15) wound along the direction in which the elongated tape-like member extends, sheet prepregs 16, 17 are sheet-like members spreading in the X direction, which is the axial direction of bar-shaped member 8 serving as the mandrel, and the Y direction orthogonal thereto, for example.

Each of sheet prepregs 16, 17 is composed of a composite material of a sheet-shaped resin and a fiber, for example. For example, each of sheet prepregs 16, 17 is such that a plurality of thin fiber lines (such as carbon fiber filaments) arranged in the form of a sheet are impregnated with a resin and are partially cured with the plurality of thin fiber lines being shaped in the form of a sheet. Such a sheet-like member is wound around, for example, the side surface (front surface) of the mandrel, thereby forming a cylindrical shape. Thus, unlike tow prepreg tape 13 (see FIG. 15) wound to have the plurality of loops, each of sheet prepregs 16, 17 is wound such that the whole of the cylindrical shape in the extending direction thereof is entirely constituted of a single sheet. Therefore, sheet prepregs 16, 17 do not have a plurality of adjacent loops in the extending direction of the cylindrical shape.

Next, the following describes a method for manufacturing fiber-reinforced member 200 of the present embodiment. Here, as an example, the following describes a method for manufacturing fiber-reinforced member 200 of the first example shown in FIG. 7; however, fiber-reinforced members 200 of the second to fifth examples shown in FIG. 8 to FIG. 11 are manufactured in basically the same manner as in the method for manufacturing fiber-reinforced member 200 of the first example.

With reference to FIG. 14, bar-like member 8 is first prepared. Bar-like member 8 has a thickness corresponding to the inner diameter of fiber-reinforced member 200 to be formed, and serves as a core material composed of a metal (iron or the like) such as a mandrel. Around the longitudinal side surface of this bar-like member 8, sheet prepreg 17 having a sheet-like shape and having a width close to the length of bar-like member 8 is wound. The winding on this occasion is performed by a general known sheet winding method. Next, in the same procedure, sheet prepreg 16 having a sheet-like shape and having the same size as that of sheet prepreg 17 is wound to cover the surface of the foregoing wound sheet prepreg. In this way, sheet prepreg 17 and sheet prepreg 16 are wound around the surface of bar-like member 8 to overlap with each other.

It should be noted that during the winding in FIG. 14, uniform force F is applied to the entire surface of bar-like member 8 (sheet prepregs 16 and 17 wound around bar-like member 8), thereby pressing sheet prepregs 16, 17 against the surface of bar-like member 8.

Figure 15:
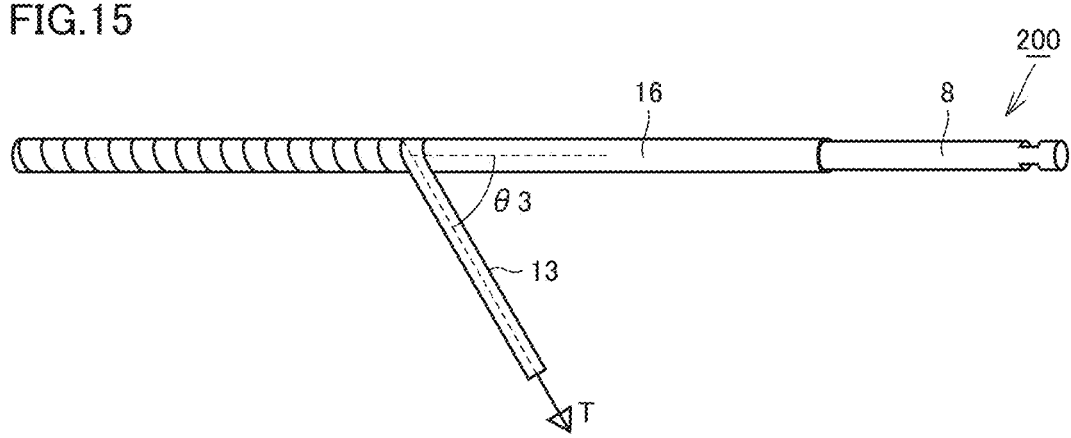
FIG. 15 is a schematic view showing a method for winding a tow prepreg tape as a second step of the manufacturing method in the second embodiment.

With reference to FIG. 15, next, tow prepreg tape 13 in the form of a tape is wound to move from one end portion (for example, the left side of the figure) of bar-like member 8 of FIG. 15 to the other end portion side (right side) so as to cover the front (outer) surface of sheet prepreg 16 wound around bar-like member 8. On this occasion, tow prepreg tape 13 is wound under application of strong tension T in the extending direction of tow prepreg tape 13.

On this occasion, tow prepreg tape 13 is preferably wound at a winding angle θ3 of not less than 20° and not more than 80°. Here, winding angle θ3 refers to an angle of the extending direction of tow prepreg tape 13 itself (the direction of a dotted line extending obliquely in FIG. 15) relative to the direction along the axial direction of the cylindrical shape such as sheet prepreg 16 around which tow prepreg tape 13 is wound (the direction of a dotted line extending in the leftward/rightward direction of FIG. 15). Stated differently, when fiber-reinforced member 200 is viewed in the radial direction, third angle θ3 of fourth FRP layer 4 is not less than 30° and not more than 80° relative to the central line (broken line B in FIG. 13) extending along the axial direction on the outer circumferential surface of fiber-reinforced member 200.

If winding angle θ3 exceeds 80° and reaches 90° for example, tow prepreg tape 13 is not moved in the axial direction of the cylindrical shape, with the result that tow prepreg tape 13 is wound at the same location repeatedly. Moreover, if winding angle θ3 falls below 20° and reaches 0° for example, tow prepreg tape 13 is wound in the extending direction along the axial direction of the cylindrical shape, with the result that the tape cannot be wound along the circumferential direction of the cylindrical shape as shown in FIG. 15. Due to the reasons above, θ3 is preferably not less than 30° and not more than 80°. In this way, the tow prepreg tape can be wound appropriately.

Moreover, when tow prepreg tape 13 is wound a plurality of times while being moved in the direction along the axial direction of the cylindrical shape as shown in FIG. 12, tow prepreg tape 13 is wound to overlap with a portion of an immediately preceding loop in the winding. The pitches of the winding loops of tow prepreg tape 13 in the axial direction of the cylindrical shape and the widths of the overlapping regions in the axial direction of the cylindrical shape may not necessarily be constant. However, it is more preferable to provide a narrower pitch at a pair of end portions of bar-like member 8 than those in the other regions in order to wind it a larger number of times, for example. In this way, the strengths of the end portions of fiber-reinforced member 200 can be further improved.

A fiber bundle constituting tow prepreg tape 13 (see FIG. 15) has such a state that tow fibers are widened in the same manner as in the first fiber bundle and the second fiber bundle in the tow prepreg tape according to the first embodiment.

The tow prepreg tape is preferably wound with the bundle of fiber lines 11 being impregnated with resin 12 and with resin 12 having not been cured. In this way, the tow prepreg tape can be very flexibly bent, and therefore can be wound smoothly.

Further, a very large number of fiber lines 11 (a bundle of gathered 24000 short fibers each having a diameter of 5 μm at a cross section crossing the extending direction of the fiber, for example) are impregnated with resin 12 with the plurality of fiber lines 11 being arranged side by side in the direction (leftward/rightward directions in FIG. 12) crossing the extending direction.

Thus, since the directions of the fibers are substantially uniform in the widened tow prepreg tape, when winding tow prepreg tape 13 of FIG. 15, tow prepreg tape 13 can be wound while applying high tension T in the direction of pulling tow prepreg tape 13 in the extending direction of tow prepreg tape 13.

Due to this tension T, the tow prepreg tape is wound while being pressed into a deforming state to have larger axial tape width Wv and smaller average thickness h of fourth FRP layer 4 as shown in FIG. 12 than those before the winding.

As described above, average thickness h of fourth FRP layer 4 has the following relation with maximum value H of the entire thickness thereof and the number of times of layering fourth FRP layer 4 (number n of times of winding the tow prepreg tape):

$$h = H/n \tag{1}.$$

As a result, the tow prepreg tape after forming fourth FRP layer 4 has large width W2 and small tape average thickness h, with the result that the size of width W2 is not less than 100 times and not more than 400 times as large as the size of tape average thickness h.

As an example, when a tow prepreg tape having a width with an initial value $W_0$ of 10 mm and having a thickness h with an initial value $h_0$ of 0.15 mm before being wound was wound twice at a winding angle θ3 of 80° under application of a tension T of 90 N for example, width Wv became 16.2 mm, maximum value H of the thickness became 0.1 mm (average thickness h of the individual tow prepreg tapes became 0.05 mm), and width W2 became 16 mm. In this case, width W2 is 320 times as large as thickness h. Moreover, as another example of the tow prepreg tape, when a tow prepreg tape having a width with an initial value $W_0$ of 10 mm and having a thickness h with an initial value $h_0$ of 0.15 mm before being wound was wound twice at a winding angle θ3 of 60° under application of a tension T of 90 N for example, width Wv became 14.4 mm, width W2 became 12 mm, and maximum value H of the thickness became 0.15 mm. In this case, average thickness h of the individual tow prepreg tape is 0.075 mm. Width W2 is 160 times as large as thickness h.

Thus, it can be said that due to both the widened fiber bundle of the tow prepreg tape and tension T applied to the tow prepreg tape during the winding thereof around bar-like member 8, width W2 of fourth FRP layer 4 becomes large and average thickness h becomes small, with the result that the tow prepreg tape is pressed into a deforming state such that a ratio of average thickness h and width W2 becomes not less than 160 and not more than 320. It should be noted that the ratio can be not less than 100 and not more than 400 by adjusting tension T and selecting a resin.

As shown in FIG. 15, after tow prepreg tape 13 is wound from one end portion to the other end portion of bar-like member 8, tow prepreg tape 13 is thermally treated in a curing oven. Then, bar-like member 8 used as the core material is removed, thereby forming fiber-reinforced member 200 which has a tubular shape and in which sixth FRP layer 6, fifth FRP layer 5, and fourth FRP layer 4 are layered in this order as a result of the winding.

<Modification of Tubular Member>

Next, the following describes cross-sectional photographs of an example of fiber-reinforced member 200 formed using the above-described manufacturing method.

Figure 16:
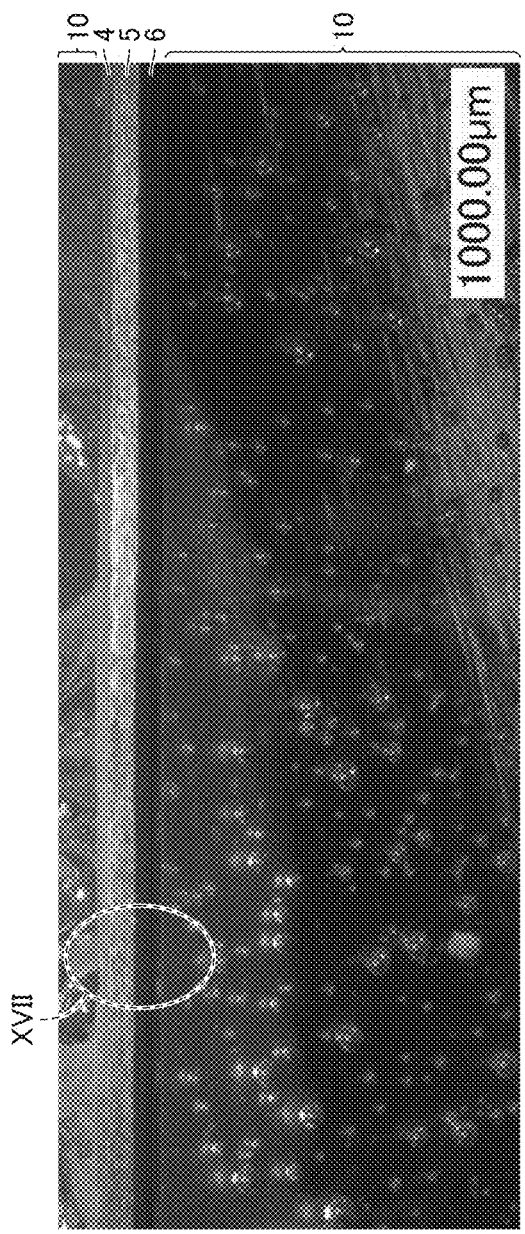
FIG. 16 shows a cross sectional photograph along an extending direction of a shaft having the configuration shown in FIG. 7.
Figure 17:
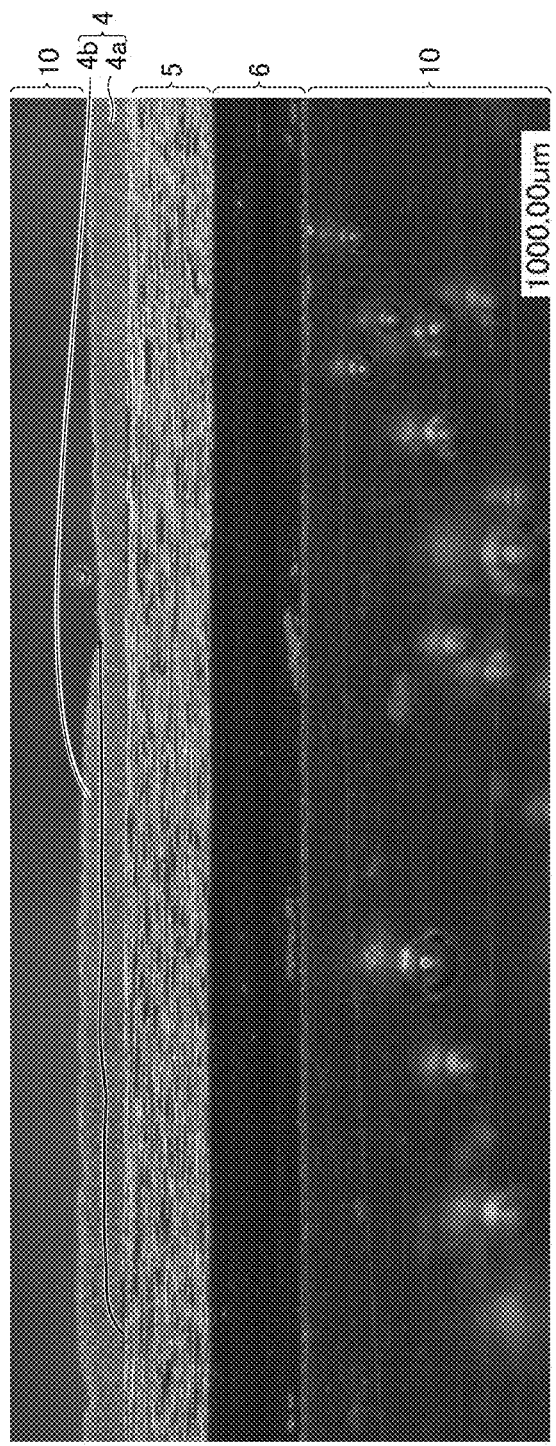
FIG. 17 shows an enlarged photograph showing a configuration of a region XVII surrounded by a dotted line in FIG. 16.

With reference to FIG. 16 and FIG. 17, these photographs are cross sectional photographs of fiber-reinforced member 200 along the axial direction. In such a fiber-reinforced member 200, sixth FRP layer 6, fifth FRP layer 5, and fourth FRP layer 4 are layered by winding as shown in FIG. 7. The leftward/rightward direction in FIG. 16 and FIG. 17 corresponds to the extending direction of fiber-reinforced member 200 (the axial direction of the cylindrical shape), and the upward/downward direction in FIG. 16 corresponds to the radial direction of the cylindrical shape of fiber-reinforced member 200. It should be noted that in the samples of the photographs of FIG. 16 and FIG. 17, the hollow portion of fiber-reinforced member 200 is packed with a resin 10 for the purpose of cross section observation in order to observe the cross section of fiber-reinforced member 200.

In the tubular member shown in FIG. 16, the tow prepreg tape is wound twice at a winding pitch of 6.4 mm at a winding angle θ3 of 70°. Axial width Wv appearing in the axial cross section is 12.8 mm. Accordingly, it is appreciated that width W2 of fourth FRP layer 4 is 12 mm based on the above-described formula (2).

With reference to FIG. 17, it is appreciated that loops partially adjacent to each other in the wound tow prepreg tape are such that a second loop of fourth FRP layer 4b overlaps with a left side region of a first loop of fourth FRP layer 4a. Moreover, since maximum value H of the thickness of fourth FRP layer 4 formed using the tow prepreg tape is 0.1 mm, average thickness h of fourth FRP layer 4 is 0.05 mm. Since width W2 is 12 mm as described above, the ratio of width W2 of fourth FRP layer 4 and average thickness h is 240.

Figure 18:
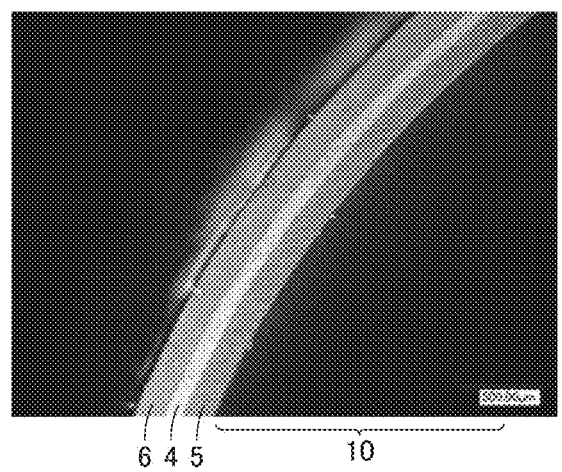
FIG. 18 shows a cross sectional photograph of a shaft having the configuration shown in FIG. 8.

With reference to FIG. 18, this photograph is a cross sectional photograph of fiber-reinforced member 200 in which the tow prepreg tape is wound around the front surface (outer side) of the sheet prepreg such that the sheet prepreg is layered on the front surface (outer side) of the tow prepreg tape as shown in FIG. 8. Also in this fiber-reinforced member 200, the ratio of width W2 of fourth FRP layer 4 and average thickness h is not less than 100 and not more than 400.

<Function and Effect of Tubular Member>

Figure 19:
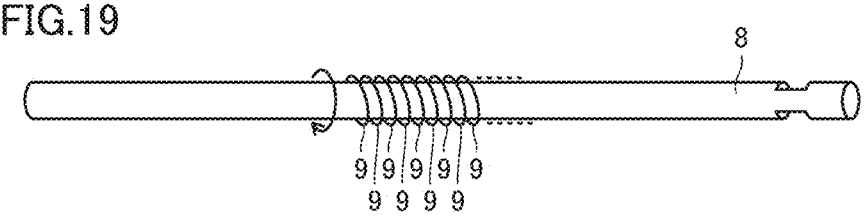
FIG. 19 is a schematic view showing a method for winding a filament as one step in a Comparative Example.

Next, the following describes function and effect of the present embodiment with reference to a comparative example of FIG. 19.

With reference to FIG. 19, in the comparative example, a carbon fiber filament 9 is wound around the side surface of bar-like member 8 in a manufacturing process, for example. It should be noted that a plurality of filaments 9 may be wound.

However, filament 9 is very thin, so that filament 9 may be cut when winding under application of high tension, disadvantageously. Hence, it is difficult to press filament 9 into a deforming state by winding filament 9 under application of tension, with the result that a space is inevitably formed between individual portions of filament 9. When a space is formed between adjacent loops of filament 9, no FRP layer is provided in the space and only the resin layer exists therein, with the result that this portion becomes weak with respect to impact force or shearing deformation force. Hence, in order to avoid formation of the space, it is necessary to narrow a pitch of winding filament 9 and increase the number of overlapped windings, thus resulting in increased manufacturing cost.

Next, for example, when forming fiber-reinforced member 200 using only the above-described sheet prepreg, a seam is formed between the winding start portion and the winding end portion. In that portion, no FRP layer is provided. This results in large variation in strength between regions of fiber-reinforced member 200 (the seam and the other portion).

To address this, the widened tow prepreg tape is used in the present embodiment. Since fiber lines 11 of the tow prepreg tape are aligned in the extending direction of the tow prepreg tape, the tow prepreg tape can be wound under application of a very high tension. Further, when the tow prepreg tape is wound under application of such a high tension, the tow prepreg tape becomes thin in thickness and is pressed to expand in the width direction due to viscoelasticity of the tow prepreg tape. Furthermore, as a result of diligent study, the inventor of the present invention has found that the strength of fiber-reinforced member 200 can be made very high as described below by forming fourth FRP layer 4 by winding the tow prepreg tape to press the tow prepreg tape into a deforming state such that the size of width W2 thereof after forming fourth FRP layer 4 is not less than 100 times and not more than 400 times as large as average thickness h of fourth FRP layer 4 for one loop in the axial cross section.

Namely, by winding the tow prepreg tape such that the ratio of width W2 of fourth FRP layer 4 and the size of average thickness h falls within a numeric value range of 100≤W/h≤400, adhesion can be continuously improved between fifth FRP layer 5 and fourth FRP layer 4 and an air layer can be reduced in a region between fifth FRP layer 5 and fourth FRP layer 4. Accordingly, remaining air, which would have otherwise caused a failure, can be suppressed as much as possible, thereby securely increasing the strength of fiber-reinforced member 200.

Moreover, when winding the tow prepreg tape, seam portions at which the fiber-reinforced resin layers each serving as the material thereof overlap with each other can be distributed across the entire fiber-reinforced member 200 as compared with a case of winding a sheet-like member such as a sheet prepreg. Accordingly, it is possible to suppress variation in strength among respective regions of fiber-reinforced member 200, thus suppressing local deformation and damage of fiber-reinforced member 200.

Moreover, since the surface of fourth FRP layer 4 is pressed and fixed in the radial direction in which fourth FRP layer 4 is wound, a portion of fourth FRP layer 4 can be brought into contact with and excellently adhered to an adjacent portion of fourth FRP layer 4 in the radial direction in which fourth FRP layer 4 is wound.

Moreover, force for pressing the tow prepreg tape into a deforming state to expand in the width direction or the like is used to send out the remaining air layer to outside the winding structure from a region between the tow prepreg tape and the sheet prepreg adjacent thereto in the winding direction, for example. The air layer causes decreased adhesion between the tow prepreg tape and the adjacent FRP layer, thereby causing delamination at an interface between respective layers. To address this, according to the above-described configuration, it is possible to reduce a possibility of air remaining in the region between the plurality of FRP layers included in fiber-reinforced member 200, thereby improving adhesion between the layers and improving reliability thereof. This is apparent from the photographs of FIG. 16 to FIG. 18. In fiber-reinforced member 200 according to the present invention, substantially no air layer is confirmed to remain between the FRP layers or in each FRP layer.

Moreover, when the tow prepreg tape is wound under application of a high tension T to be pressed into a deforming state such that the ratio of width W2 and average thickness h has the above-described value, high pressure can be applied to the sheet prepreg at the lower portion. Moreover, by reducing the air layer remaining in the FRP layer at the inner side in the radial direction in which the tow prepreg tape is wound, the cause of failure of each FRP layer can be reduced and adhesion can be improved between the inner side FRP layer and the outer side FRP layer. Further, by reducing the air layer as described above, adhesion between the tow prepreg tape and the adjacent FRP layer is improved, thus improving reliability thereof.

As shown in FIG. 15, the tow prepreg tape is wound under application of strong tension T in the extending direction thereof. In such a winding method, air remaining at the lower side (inner side) of the tow prepreg tape can be more likely to be sent out to the outside as compared with a method for winding a sheet prepreg under application of force F to the whole of the sheet prepreg as shown in FIG. 14.

For example, in the method of FIG. 14, the sheet prepreg is wound while applying force F of 2700 N to the whole of bar-like member 8 having a total length of 1200 mm. Force F applied per unit length (1 mm) of bar-like member 8 on this occasion is 2.25 N/mm on average. On the other hand, in the method of FIG. 15, a tow prepreg tape having a width of 10 mm is wound under application of a tension T of 90 N. Tension T applied per unit length (1 mm) of the tow prepreg on this occasion is 9 N/mm on average. Also based on this fact, it is understood that when the present embodiment is used, the tow prepreg tape is wound under application of a stronger force, thereby improving adhesion or the like.

Accordingly, fiber-reinforced member 200 is formed to have a high-precision cylindrical shape transferred from the mandrel or the like serving as bar-like member 8 (having the shape corresponding to the inner diameter of fiber-reinforced member 200) while suppressing formation of a space between the tow prepreg tape and the sheet prepreg and a space between the sheet prepregs, for example. This makes it possible to reduce a possibility of forming a step or the like in the surface of fiber-reinforced member 200, whereby the surface of fiber-reinforced member 200 can be finished to be more flat (smooth).

Further, due to the widening upon the formation and the application of high tension T upon the winding, the tow prepreg tape is pressed to expand, with the result that the plurality of fiber lines 11 included in the tow prepreg tape extend locally obliquely to partially cross each other in fiber-reinforced member 200 after the winding. That is, the tow prepreg tape is pressed to expand in the width direction such that part of fiber lines 11 extend in the direction along the direction (circumferential direction) in which the tow prepreg tape is wound and another part of fiber lines 11 cross the foregoing part of fiber lines 11 at some locations. When fiber lines 11 are entangled locally in this way, the entire strength can be improved significantly as compared with a case where all of fiber lines 11 extend in one direction.

Moreover, since the tow prepreg tape is expanded such that fiber lines 11 extend obliquely, the tow prepreg tape can be wound while applying pressure to the surface of fiber-reinforced member 200 more uniformly. Accordingly, variation in thickness of the cylindrical shape of fiber-reinforced member 200 is reduced, thereby attaining uniform entire thickness.

Next, in the present embodiment, the tow prepreg tape is wound such that one of a pair of adjacent loops overlaps with at least a portion of the other in the direction along the axial direction of the cylindrical shape. This suppresses formation of a weak strength region in which no fiber line 11 extends and only resin 12 is disposed between the pair of adjacent loops, thereby improving the strength of the whole of fiber-reinforced member 200. Moreover, fiber-reinforced member 200 becomes strong with respect to shear fracture and impact fracture.

It should be noted that the tow prepreg tape is preferably wound as an upper layer (outer layer) relative to the lowermost layer (innermost layer), rather than the lowermost layer among the plurality of wound FRP layers. In this way, the tow prepreg tape can be wound under application of a strong tension to cover the sheet prepreg or the layer of filament 9 wound through a filament winding method. When thus winding the tow prepreg tape to cover the weak strength portion such as a seam between sheet portions of the sheet prepreg, a sheet winding starting end, a terminal portion, or a portion between portions of the filament, the whole of formed fiber-reinforced member 200 can be further reinforced. This is due to the following reason: since strong tension T is applied to the tow prepreg tape (see FIG. 15 and FIG. 11), the tow prepreg tape is expanded to be thin, thereby increasing adhesion with the sheet prepreg, filament 9, or the like. Moreover, the above-described tow prepreg tape can suppress development of failure from the seam of the sheet prepreg.

Third Embodiment

Figure 20:
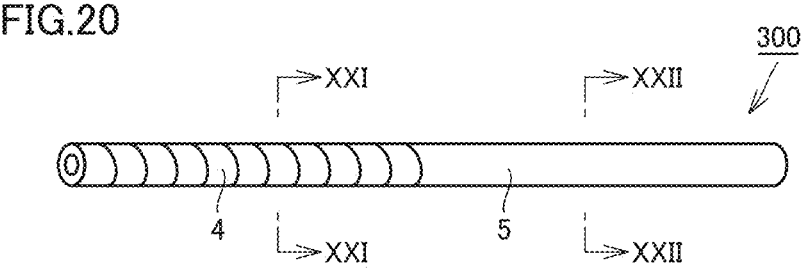
FIG. 20 is a schematic view showing an exemplary external appearance of a fiber-reinforced member 300 of a third embodiment.
Figure 21:
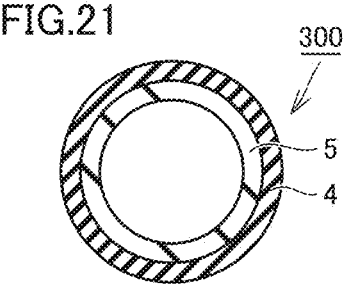
FIG. 21 is a schematic cross sectional view showing a configuration of a portion along an XXI-XXI line of FIG. 20.
Figure 22:
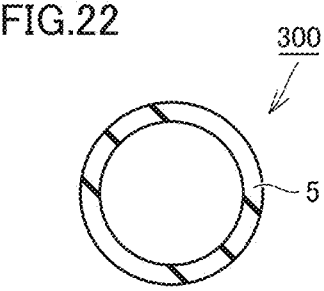
FIG. 22 is a schematic cross sectional view showing a configuration of a portion along an XXII-XXII line of FIG. 20.

With reference to FIG. 20 to FIG. 22, a fiber-reinforced member 300 of the present embodiment has basically the same configuration as that of fiber-reinforced member 200 of the second embodiment but is different therefrom in the following point. Specifically, for example, as with FIG. 9 (third example) of the second embodiment, fiber-reinforced member 300 is configured such that a tow prepreg tape is wound around the outer side of a sheet prepreg having a cylindrical shape. However, fiber-reinforced member 300 is wound around the surface of the sheet prepreg to cover only a portion of the surface (only the left side region in FIG. 20)

of the sheet prepreg. Namely, in the present embodiment, the tow prepreg tape is wound around a portion of the cylindrical shape of fiber-reinforced member 300, rather than the whole of the cylindrical shape of fiber-reinforced member 300 in the direction along the axial direction.

In this point, fiber-reinforced member 300 of the present embodiment has a different configuration from that of fiber-reinforced member 200 of the second embodiment in which the tow prepreg tape is substantially entirely wound around the cylindrical shape in the direction along the axial direction of the cylindrical shape. However, in other points, fiber-reinforced member 300 has basically the same configuration as that of fiber-reinforced member 200 (FIG. 9), so that the same components are given the same reference characters and are not described repeatedly.

It should be noted that each of FIG. 20 to FIG. 22 illustrates an example in which the tow prepreg tape of FIG. 9 (third example) of the second embodiment is wound to cover only a portion of the surface of the sheet prepreg. However, the configuration is not limited to this, and the tow prepreg tape of each of FIGS. 7 and 8 (the first example and the second example) of the second embodiment may be wound to cover only a portion of the surface of the sheet prepreg, for example.

For example, the configuration of the present embodiment is preferably applied in the case of reinforcing a shaft locally, such as a case of reinforcing only the left side region of FIG. 20. In this way, only a necessary portion can be reinforced efficiently while reducing the cost as compared with a case where the tow prepreg tape is wound entirely.

It should be noted that each of FIG. 20 to FIG. 22 shows a two-layer structure in which the tow prepreg tape is wound around the outer side of the sheet prepreg. However, also in the present embodiment, a three-layer structure may be partially formed, such as the one shown in each of FIGS. 7 and 8. Moreover, also in the present embodiment, a four-layer structure may be partially formed such as the one shown in each of FIGS. 10 and 6. Alternatively, a five or more layer structure may be employed.

In the description above, it has been illustrated that each of fiber-reinforced members 200, 300 of the present invention is mainly applied to a pipe-like member such as a golf club shaft or a pipe, the present invention is not limited to this and the shaft of the present invention is applicable also to a hitting portion of a baseball bat, for example. Further, it is also considered to apply the shaft of the present invention to an industrial application, such as an arm portion of a picking arm robot.

Example 11

In the present example, a test specimen of fiber-reinforced member 100 according to the first embodiment was formed and was subjected to measurement of failure strength and the like.

<Test Specimen>

As the test specimen employing the first embodiment, a test specimen (invention product) was prepared which had the same configuration as that of fiber-reinforced member 100 shown in FIG. 1 and FIG. 2A to FIG. 2D. Specifically, a liner was prepared which was composed of polyethylene, had a length of 641 mm in the axial direction, had an outer diameter of 300 mm at the central portion in the axial direction, and had a thickness of 10 mm. Next, a tow prepreg was prepared in which a bundle of 36000 PAN-based carbon fiber filaments each having a fiber density of 1.8 g/cm$^2$ and an outer diameter of not less than 7 µm and not more than 10 µm had been impregnated with a resin (main component: XNR6805) in advance. Next, the fiber bundle widened by applying predetermined contact pressure to the tow prepreg was wound on the liner under application of tension in the extending direction. First, when viewed in the radial direction of the liner, the fiber bundle was hoop-wound around the liner in a direction perpendicular to the axial direction of the liner. The number of times of hoop-winding was 24. Next, when viewed in the radial direction of the liner, the fiber bundle was helically wound on the liner to be in a substantially mirror-image relation with respect to the axial direction of the liner and to have first angle θ1 and second angle θ2 of not less than 30° and not more than 60°. It should be noted that the winding direction of the fiber bundle was changed on the regions close to the both ends thereof in the axial direction. Thus, the fiber bundle on the regions was wound such that each of first angle θ1 and second angle θ2 was not more than 80°. The number of times of helical-winding was 16 in the first direction and was 16 in the second direction, i.e., was 32 in total. Then, the fiber bundle was thermally treated in a curing oven for the purpose of formation. The thermal treatment was performed by maintaining at 135° C. for 6 hours. Accordingly, a test specimen (tank) serving as fiber-reinforced member 100 was formed to include: the third FRP layer constituting base member 1; and first FRP layer 2a and second FRP layer 2b alternately layered on the third FRP layer. In the test specimen, the W/h ratio of each of first FRP layer 2a and second FRP layer 2b was 100. The test specimen had a length of 895 mm in the axial direction, and had an outer diameter of 370 mm at the central portion in the axial direction. Moreover, regarding the thickness of each FRP layer on the tubular region of the tank, the thickness of the third FRP layer was 20 mm and the total thickness of first FRP layer 2a and second FRP layer 2b was 15 mm. It should be noted that the length of the tank in the axial direction includes a metal cap for introducing a test liquid into the tank in a bursting test described below. Moreover, each FRP layer on the tubular region was the thinnest portion of the thickness of each FRP layer formed on the test specimen.

As a test specimen of a Comparative Example, a test specimen (tank) was formed using a conventional filament winding method. The test specimen of the Comparative Example was formed using basically the same material as each material of the above-described test specimen of the Example. In the test specimen of the Comparative Example, the third FRP layer, the first FRP layer, and the second FRP layer were formed by winding a prepared non-widened tow prepreg under a comparable tension to attain the same size as that of the test specimen of the Example. Therefore, the number of times of layering the third FRP layer and the number of times of layering the first FRP layer and the second FRP layer in the test specimen of the Comparative Example are both smaller than those in the test specimen of the Example. In the test specimen, the W/h ratio of each of the first FRP layer and the second FRP layer was 60.

It should be noted that the weight content of the epoxy-based resin was 30%±1% in each of the third FRP layer, the first FRP layer, and the second FRP layer in each of the Example and the Comparative Example.

<Details of Test>

Each of the test specimens was subjected to a bursting test based on the engineering documentation KHKTD5202 (2014) standard on composite pressure vessels for compressed hydrogen pressure accumulators by the Institution for Safety of High Pressure Gas Engineering. A test liquid (liquid having no corrosiveness and hazard) used was water.

After filling the tank of each test specimen with water, pressure is applied and gradually increased at an equal rate using a pressure device until each of the test specimens was burst. The rate of increasing the pressure was about 0.15 MPa. A test temperature was a normal temperature. A pressure (bursting pressure) upon burst of each test specimen was measured.

<Result>

The test specimen of the Comparative Example was burst at a pressure of 269 MPa. On the other hand, the test specimen of the Example was burst at a pressure of 285 MPa. It was confirmed that the test specimen of the Example was improved significantly in terms of the bursting pressure as compared with the test specimen of the Comparative Example. It should be noted that in each test specimen, delamination was confirmed in the first FRP layer or second FRP layer.

Figure 23:
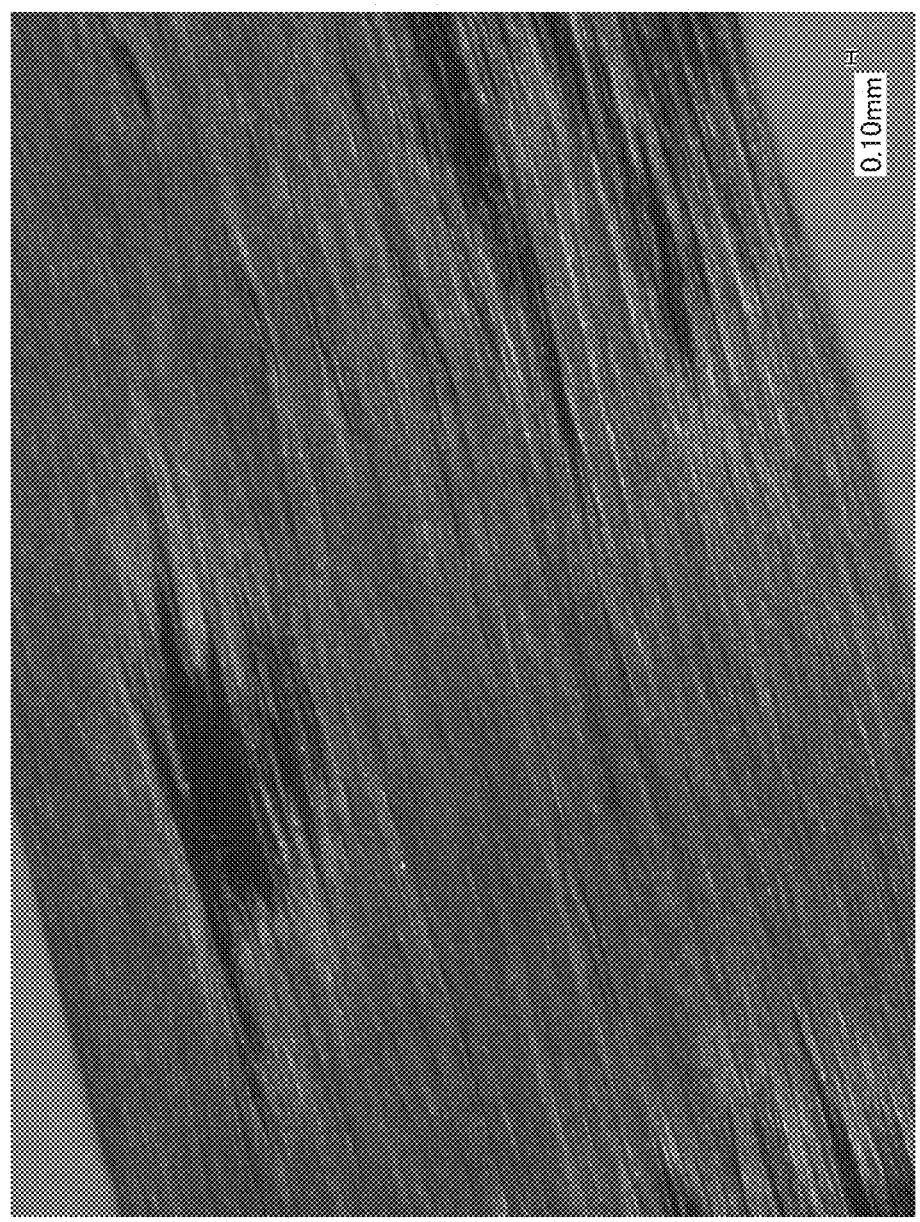
FIG. 23 shows an enlarged photograph of a tow prepreg tape having the same configuration as that of a tow prepreg used for production of a test specimen as an Example in an Example 1.
Figure 24:
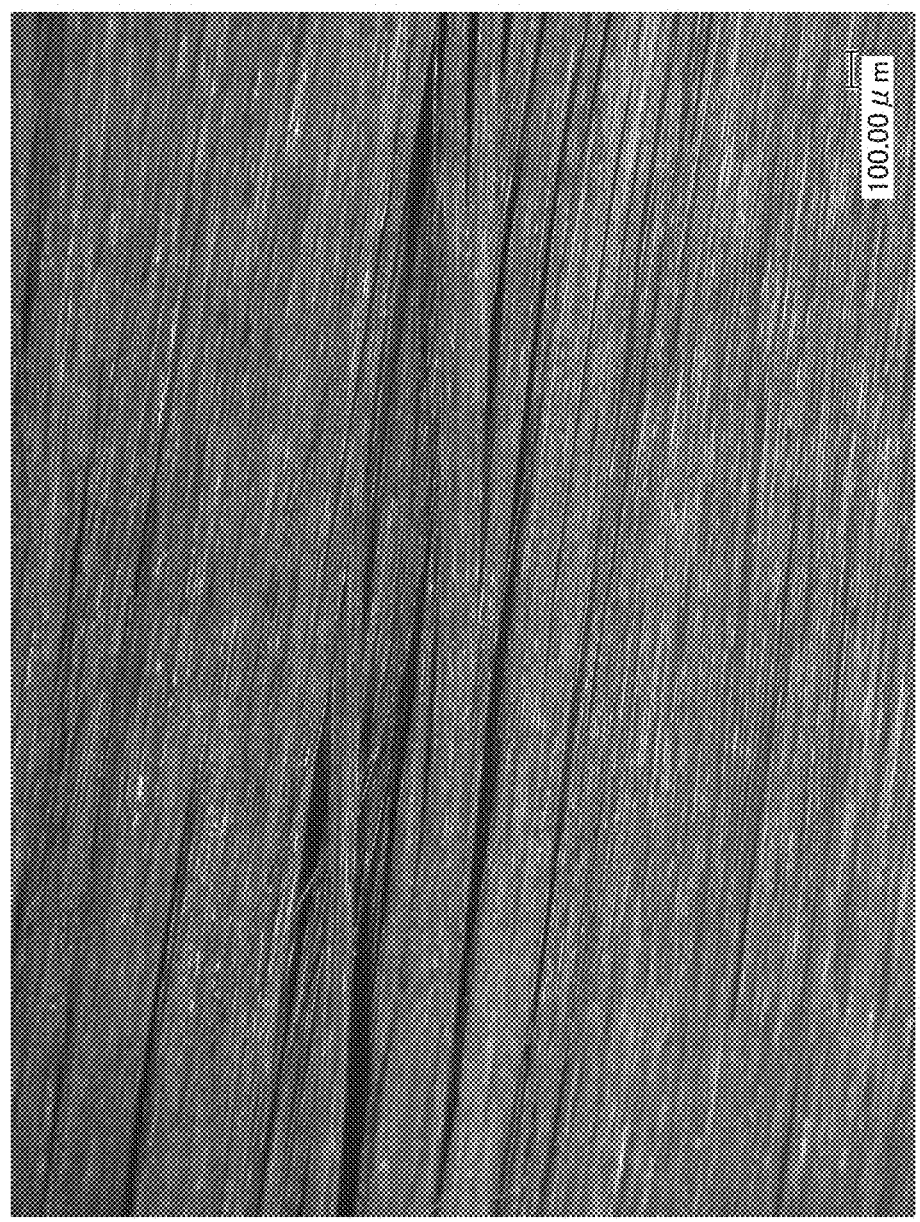
FIG. 24 shows an enlarged photograph of the tow prepreg tape having the same configuration as that of the tow prepreg used for production of the test specimen as the Example in Example 1.

Each of FIG. 23 and FIG. 24 shows an observation image when observing, using an optical microscope, an external appearance of a tow prepreg tape having the same configuration as that of the tow prepreg tape used for production of the first FRP layer and the second FRP layer in the test specimen of the Example. FIG. 23 shows an observation image at a magnification of ×50, whereas FIG. 24 shows an observation image at a magnification of ×100. As shown in FIG. 23 and FIG. 24, it was confirmed that part of filaments obliquely cross to the other filaments in the tow prepreg tape.

Example 2

In the present example, a test specimen of fiber-reinforced member 200 serving as a pipe was formed and subjected to measurement of strength and the like.

<Test Specimen>

As the test specimen using the second embodiment, a test specimen (invention product) was prepared which had the same configuration as that of fiber-reinforced member 200 shown in FIG. 7. The test specimen included: sixth FRP layer 6 and fifth FRP layer 5 each constituted of a sheet prepreg; and fourth FRP layer 4 formed to cover the front surface (outer side) thereof and constituted of a tow prepreg tape.

Specifically, as a core material for forming the invention product, bar-like member 8 was used which had a length of 700 mm and had a circular cross section with a diameter of 12.8 mm. Next, a sheet prepreg was wound on a surface thereof as a first layer (inner layer). In the sheet prepreg, a bundle of 36000 carbon fiber filaments each having a fiber density of 1.8 g/cm$^2$ and an outer diameter of not less than 7 μm and not more than 10 μm had been impregnated with a resin (main component: XNR6805) in advance. The thickness of the sheet prepreg before the winding was 0.2 mm. The sheet prepreg was wound such that an angle (winding angle θ3 in FIG. 15) was 45° between the extending direction of each fiber line therein and the direction along the extending direction of bar-like member 8.

Moreover, a sheet prepreg composed of the same material and having the same thickness as those of the tow prepreg constituting the first layer was wound on the first layer. However, this sheet prepreg as the second layer was wound such that the angle (winding angle θ3 in FIG. 15) was −45° between the extending direction of each fiber line therein and the direction along the extending direction of bar-like member 8 (i.e., the angle was 90° between the extending direction of each fiber line therein and the extending direction of each fiber line of the sheet prepreg constituting the first layer). It should be noted that the sheet prepreg was pressed by a force of 2700 N.

Next, as a third layer (outer layer), a tow prepreg tape having widened tow fibers impregnated with an epoxy-based resin was wound to cover the surface of the sheet prepreg constituting the second layer. The tow fibers were a bundle of 36000 PAN-based carbon fiber filaments each having a fiber density of 1.8 g/cm$^2$ and an outer diameter of not less than 7 μm and not more than 10 μm. The width thereof crossing the extending direction of the tow prepreg tape before the winding was 10 mm, and the thickness thereof before the winding was 0.15 mm. Moreover, the tow prepreg tape was wound twice such that an angle (winding angle θ3 in FIG. 15) was 80° between the extending direction of each fiber line of the tow prepreg tape and the extending direction of bar-like member 8. It should be noted that tension of the tow prepreg tape on this occasion was 90 N. A pitch between a pair of adjacent loops of the wound tow prepreg tape in the axial direction of the cylindrical shape was 8.0 mm, and an overlapping portion of the pair of adjacent loops (after the winding) was 8 mm. The width thereof crossing the extending direction of the tow prepreg tape after the winding was 16 mm.

In the present invention product formed as described above, axial tape width Wv was 16.2 mm. Based on the formula (2) above, W was 16 mm. Moreover, average thickness h of the individual tow prepreg tape was 0.05 mm (maximum value H of the thickness of the fourth FRP layer was 0.1 mm), whereby the value of W/h of the present invention product was 320.

On the other hand, a test specimen (comparative product) for comparison with the present invention product was prepared. In the test specimen for comparison, a sheet prepreg (not shown) was wound instead of the tow prepreg tape of FIG. 7 as described below. First, as a core material for forming the comparative product, bar-like member 8 was used which had a length of 700 mm and had a circular cross section having a diameter of 12.6 mm. Then, on a surface thereof, a sheet prepreg was wound as a first layer (inner layer). The sheet prepreg had a configuration comparable to that of the tow prepreg of the first layer of the above-described present invention product. The thickness of the sheet prepreg before the winding was 0.2 mm. The sheet prepreg was wound such that an angle (winding angle θ3 in FIG. 15) was 45° between the extending direction of each fiber line therein and the extending direction of bar-like member 8.

Moreover, a sheet prepreg composed of the same material and having the same thickness as those of the tow prepreg constituting the first layer was wound on the first layer. However, this sheet prepreg constituting the second layer was wound such that the angle (winding angle θ3 in FIG. 15) was −45° between the extending direction of each fiber line therein and the extending direction of bar-like member 8 (i.e., the angle was 90° between the extending direction of each fiber line therein and the extending direction of each fiber line of the sheet prepreg constituting the first layer).

Next, as a third layer (outer layer), a sheet prepreg (not shown) composed of the same fiber as that of the tow prepreg constituting the third layer of the invention product was wound to cover the surface of the sheet prepreg constituting the second layer. The thickness of the sheet prepreg before the winding was 0.15 mm. The sheet prepreg was wound twice such that an angle (winding angle θ3 in FIG. 15) was 90° between the extending direction of each fiber line therein and the direction along the extending direction of bar-like member 8. It should be noted that the sheet prepreg, the sheet prepreg, and the sheet prepreg (not shown) disposed outwardly thereof were pressed at a force of 2700 N.

It should be noted that the weight content of the epoxy-based resin was 35%±5% in each of the fiber layers of the invention product and the comparative product, i.e., the first layer (inner layer), the second layer (middle layer), and the third layer (outer layer).

Each of the test specimens having been through the above-described winding was wrapped by winding a polypropylene tape, thereby maintaining the shape thereof. A winding tension on this occasion was 50 N. Then, each of the test specimens was thermally treated in a curing oven for the purpose of formation. The thermal treatment was performed by maintaining at 135° C. for 6 hours. In this way, the test specimens (the invention product and the comparative product) were formed.

<Details of Test>

Figure 25:
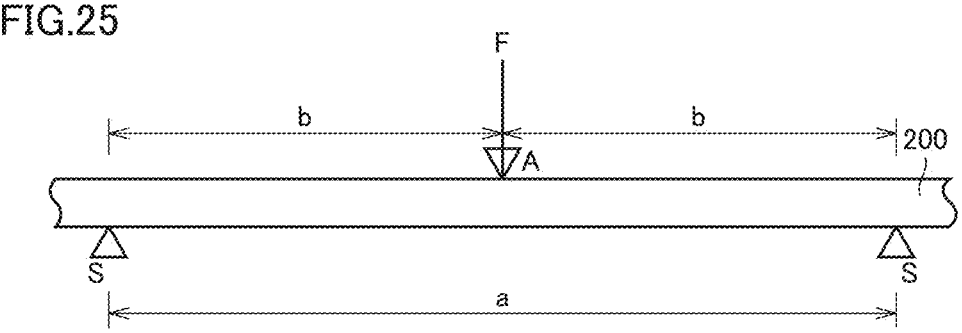
FIG. 25 is a schematic view showing a manner of a three-point bending test in an Example 2.

Next, the following describes a measurement test for the strength of each of the above-described test specimens. The strength was measured using a three-point bending tester provided by Shimadzu. Specifically, with reference to FIG. 25, equipment was prepared in which a distance a between a pair of supporting points S was 600 mm and an indenter A was disposed in the middle between the pair of supporting points S (i.e., indenter A was disposed such that a distance b from each of the pair of supporting points S to indenter A was 300 mm). In the equipment, each of fiber-reinforced members 200 (inclusive of both the invention product and the comparative product) serving as the test specimens was set to be supported by the pair of supporting points S.

Load F is applied downward from indenter A, thereby causing bending failure of fiber-reinforced member 200. The diameters and inner diameters of failed portions at five locations were measured using a vernier caliper. Based on an average outer diameter D, an average inner diameter d, a maximum failure load P, and a maximum failure displacement x, bending failure stress σ and maximum bending strain c of fiber-reinforced member 200 just below indenter A upon the failure were determined using the following material mechanics expressions:

$$\sigma = (b*P/2)/[(D^4-d^4)*\pi/D/32] \quad (3)$$

$$\varepsilon = (x*D)/(b^2+x^2) \quad (4)$$

It should be noted that three samples were prepared for each of the invention product and the comparative product, and were subjected to the same test. Results thereof are shown in Table 1 and Table 2 below as well as FIG. 26.

<Result>

TABLE 1

| | Average Outer Diameter D (mm) | Average Inner Diameter d (mm) | Thickness (mm) | Maximum Displacement (mm) | Maximum Failure Load (N) | Maximum Bending Strain | Bending Failure Stress (N/mm$^2$) |
|---|---|---|---|---|---|---|---|
| Comparative Product 1 | 13.86 | 12.63 | 0.615 | 98.0 | 123.4 | 0.014 | 228.0 |
| Comparative Product 2 | 13.85 | 12.63 | 0.610 | 134.0 | 134.3 | 0.017 | 250.3 |
| Comparative Product 3 | 13.86 | 12.63 | 0.615 | 128.5 | 140.3 | 0.017 | 259.2 |
| Comparative Product Average | 13.86 | 12.63 | 0.613 | 120.2 | 132.6 | 0.016 | 245.8 |

TABLE 2

| | Average Outer Diameter D (mm) | Average Inner Diameter d (mm) | Thickness (mm) | Maximum Displacement (mm) | Maximum Failure Load (N) | Maximum Bending Strain | Bending Failure Stress (N/mm$^2$) |
|---|---|---|---|---|---|---|---|
| Invention Product 1 | 13.88 | 12.83 | 0.525 | 131.1 | 140.5 | 0.017 | 297.4 |
| Invention Product 2 | 13.86 | 12.83 | 0.515 | 144.6 | 142.5 | 0.018 | 307.7 |
| Invention Product 3 | 13.86 | 12.83 | 0.515 | 133.1 | 135.0 | 0.017 | 291.5 |
| Invention Product Average | 13.87 | 12.83 | 0.518 | 136.3 | 139.3 | 0.017 | 298.9 |

Figure 26:
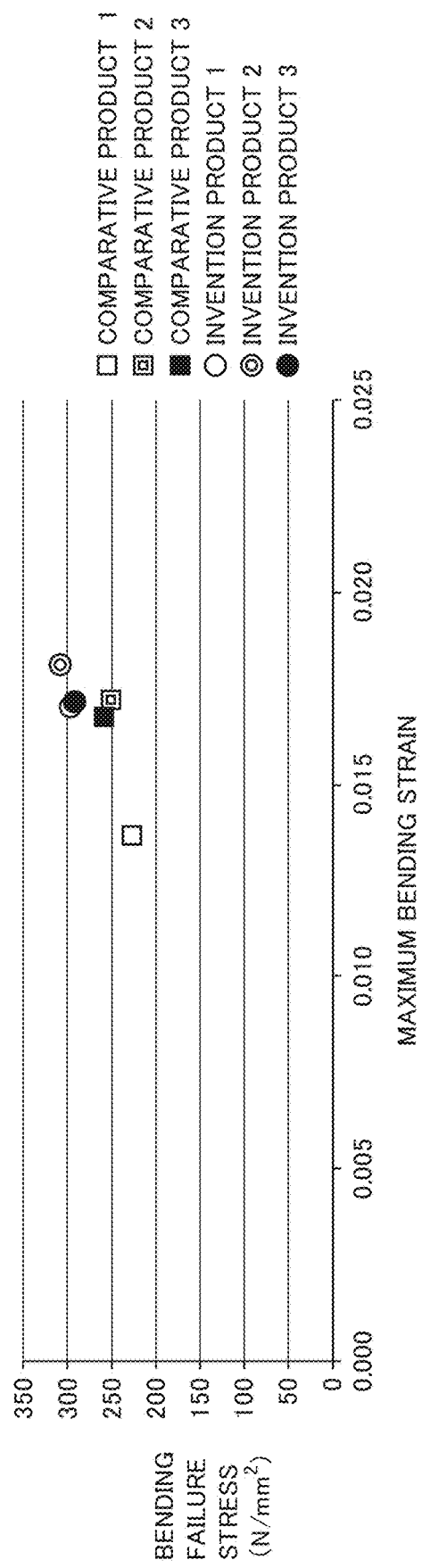
FIG. 26 is a graph showing a result of measurements shown in Table 1 and Table 2 in Example 2.

With reference to Table 1, Table 2, and FIG. 26, in view of these data, it was found that both the maximum bending strain and the bending failure stress of the invention product including the tow prepreg tape of the present embodiment were larger than those of the comparative product including no tow prepreg tape of the present embodiment, thereby achieving improved strength.

It should be noted that the average thickness of the comparative product was 0.613 mm, whereas the average thickness of the invention product was 0.518 mm. That is, the average thickness of the invention product was thinner by about 0.1 mm than the average thickness of the comparative product. This is because the tow prepreg tape was wound while being compressed under application of large tension in the invention product.

Even though the invention product was thinner than the comparative product, the invention product had improved strength as compared with the comparative product. In view of this, it is considered that when the thickness of the invention product is the same as that of the comparative product, the invention product has more improved strength than that of the comparative product.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A fiber-reinforced member comprising:
   a base member having a tubular region with an outer circumferential surface extending along and substantially in parallel with an axial direction; and
   a fiber-reinforced resin layer constituted of a tow prepreg wound in an overlapping manner to cover the outer circumferential surface of the base member along a predetermined direction crossing the axial direction when viewed in a radial direction of the base member, the tow prepreg serving as a widened tape-like member,
   the tape-like member constituting the fiber-reinforced resin layer having a portion having a small fiber bundle extending along a direction crossing the predetermined direction in which the portion extends and a fiber line extending along a direction crossing the predetermined direction in which the portion extends,
   a size of a width of the tape-like member constituting the fiber-reinforced resin layer being not less than 100 times and not more than 400 times as large as a size of a thickness of the tape-like member constituting the fiber-reinforced resin layer in the radial direction.

2. The fiber-reinforced member according to claim 1, wherein
   the fiber-reinforced resin layer includes: a first fiber-reinforced resin layer constituted of the tape-like member wound at a first angle relative to the axial direction when viewed in the radial direction of the base member; and a second fiber-reinforced resin layer constituted of the tape-like member wound at a second angle relative to the axial direction when viewed in the radial direction, the second angle being different from the first angle positively and negatively,
   the tape-like member constituting the first fiber-reinforced resin layer crosses the tape-like member constituting the second fiber-reinforced resin layer when viewed in the radial direction of the base member,
   the tape-like member constituting the first fiber-reinforced resin layer has a first fiber line extending along a direction crossing a direction represented by the first angle,
   the tape-like member constituting the second fiber-reinforced resin layer has a second fiber line extending along a direction crossing a direction represented by the second angle,
   a size of a width of the tape-like member constituting the first fiber-reinforced resin layer being not less than 100 times and not more than 400 times as large as a size of a thickness of the tape-like member constituting the first fiber-reinforced resin layer, and
   a size of a width of the tape-like member constituting the second fiber-reinforced resin layer being not less than 100 times and not more than 400 times as large as a size of a thickness of the tape-like member constituting the second fiber-reinforced resin layer.

3. The fiber-reinforced member according to claim 2, wherein each of the first fiber-reinforced resin layer and the second fiber-reinforced resin layer has a resin content of not less than 29 weight % and not more than 33 weight %.

4. The fiber-reinforced member according to claim 2, wherein an absolute value of each of the first angle and the second angle is not less than 30° and not more than 80°.

5. The fiber-reinforced member according to claim 2, wherein the first fiber-reinforced resin layer and the second fiber-reinforced resin layer are layered alternately in the radial direction of the tubular region.

6. The fiber-reinforced member according to claim 1, wherein the tape-like member constituting the fiber-reinforced resin layer is wound such that one of a pair of loops adjacent to each other in the wound tape-like member in a direction along the axial direction overlaps with at least a portion of the other of the pair of loops.

7. The fiber-reinforced member according to claim 6, wherein on the outer circumferential surface, the fiber-reinforced resin layer forms a third angle of not less than 30° and not more than 80° relative to a central line extending along the axial direction when viewed in the radial direction of the base member.

8. The fiber-reinforced member according to claim 2, wherein
   the base member includes a third fiber-reinforced resin layer,
   the third fiber-reinforced resin layer has a third fiber bundle, and
   a third angle formed by an extending direction of the third fiber bundle relative to the axial direction is different from the first angle.

9. The fiber-reinforced member according to claim 1, wherein the base member is a hollow tank member.

10. The fiber-reinforced member according to claim 1, wherein the base member is a pipe-like member.

* * * * *